US008620308B2

(12) United States Patent
Maria

(10) Patent No.: US 8,620,308 B2
(45) Date of Patent: Dec. 31, 2013

(54) METHOD AND APPARATUS FOR A DISTRIBUTED ROAMING MASTER (DRM) IN WIRELESS DATA NETWORKS

(75) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 482 days.

(21) Appl. No.: 12/541,599

(22) Filed: Aug. 14, 2009

(65) Prior Publication Data

US 2011/0039518 A1 Feb. 17, 2011

(51) Int. Cl.
*H04W 4/00* (2009.01)
*H04W 36/00* (2009.01)
*H04W 40/00* (2009.01)
*H04M 11/00* (2006.01)
*H04L 12/66* (2006.01)

(52) U.S. Cl.
USPC ............... 455/432.1; 455/406; 455/432.2; 455/432.3; 455/433; 455/436; 455/438; 455/445; 370/329; 370/331; 370/328; 370/352

(58) Field of Classification Search
USPC ........ 455/411, 432.1, 436, 406, 432.2, 432.3, 455/433, 438, 445; 370/329, 331, 328, 352; 726/4; 713/168
See application file for complete search history.

(56) References Cited

U.S. PATENT DOCUMENTS

| 2006/0179307 | A1* | 8/2006 | Stieglitz et al. ............... 713/168 |
| 2007/0060127 | A1* | 3/2007 | Forsberg ........................ 455/436 |
| 2007/0072605 | A1* | 3/2007 | Poczo ......................... 455/432.2 |
| 2008/0155659 | A1* | 6/2008 | Gazier et al. ...................... 726/4 |
| 2009/0186601 | A1* | 7/2009 | Hahn ............................ 455/411 |
| 2009/0196245 | A1* | 8/2009 | Ji .................................. 370/329 |
| 2010/0238900 | A1* | 9/2010 | Johansson et al. ............. 370/331 |
| 2010/0290607 | A1* | 11/2010 | Cai et al. .................. 379/121.01 |
| 2011/0092203 | A1* | 4/2011 | Bocking et al. ............ 455/432.1 |
| 2011/0268106 | A1* | 11/2011 | Dalton et al. ................. 370/352 |

\* cited by examiner

*Primary Examiner* — Inder Mehra
(74) *Attorney, Agent, or Firm* — Turocy & Watson, LLP

(57) ABSTRACT

A system and methodology that can facilitate communication between home and roaming radio access networks by employing IP-based messaging is provided. The system employs a Distributed Roaming Master (DRM) that facilitates authentication and/or authorization of roaming UEs (user equipment) by employing information, which can be downloaded from a home carrier-DRM over an IP network, in advance or in real time. Further, the DRM can utilize the downloaded information to route data packets between authorized roaming UEs and end-destinations, over the IP network. Furthermore, the system can implement Distributed Roaming Servers (DRS), which can be distributed at strategic points in the radio access networks and can perform a subset of functions performed by the DRM. Additionally, the system can include a Distributed Roaming Configuration Server (DRCS) that facilitates management and configuration of the DRM and/or DRSs based on one or more records stored in a Distributed Roaming Security Catalog (DRSC).

15 Claims, 17 Drawing Sheets

METHOD AND APPARATUS FOR A DISTRIBUTED ROAMING MASTER (DRM) IN WIRELESS DATA NETWORKS

TECHNICAL FIELD

The subject innovation relates to wireless communications and, more particularly, to employing a Distributed Roaming Technology Architecture for roaming user(s) in wireless data network(s).

BACKGROUND

Technological advances have provided global communication systems that can connect users all around the world. Universal Mobile Telecommunications System (UMTS) offers a consistent set of services to mobile, computer and/or phone users, no matter where they are located in the world. In this regard, UMTS is a real global system, comprising both terrestrial and satellite components. Typically, UMTS can utilize a Virtual Home Environment (VHE), which can enable a roaming user to employ the same services at home, in the office, or in the field through a combination of transparent terrestrial and satellite connections. Further, UMTS networks can ensure that a user can experience a consistent set of services thus "feeling" on his home network, independent of the location or access mode (satellite or terrestrial) even when the user roams from his network to other UMTS operators.

Conventionally, UMTS users roaming in areas, serviced by carriers that are not their home-based contracted carrier, rely on the 3GPP roaming architecture standards in order to roam. The 3GPP architecture defines how services can be obtained and how data packets can be routed to and/or from the home carrier core mobility network. Typically, the process starts with a user attaching to a roaming network's radio access network via a roaming Service GPRS Support Node (SGSN). Moreover, the SGSN signals an Home Location Register (HLR) associated with the user's home carrier network via SS7 (Signaling System 7) messages in order to determine the validity of the user. In response, the HLR can return an authentication vector and/or a user profile via SS7 messages, which can then be employed by the roaming network to challenge the identity of the user and receive an expected response. If the expected response matches the HLR provided vector, the user is authenticated and data packets are forwarded from the roaming network SGSN to the home-carrier core mobility network where a gateway support node (GGSN) routes the packets to their end-destination.

Thus, the conventional roaming architecture relies on an active link between the roaming network SGSN and the home network HLR for authentication and profile provisioning. Further, the conventional roaming architecture also relies on an active link between the roaming network SGSN and the home network GGSN for gateway services. These data link and routing services are generally provided by Global Roaming Exchange (GRX) carriers. If these links are not present, for example, when a connection is lost, the roaming network is unable to authenticate the user and route the data packets to the home network for gateway distribution services. Further, these traditionally employed active links have several performance and cost limitations. The traffic at a home carrier GGSN is significant and can lead to congestion, degraded performance, and/or slow connections. Further, roaming carrier can perform operations only when connected via an active SS7 link to the home carrier and a loss of connectivity can interrupt/cease operations.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

In various embodiments, systems and methods are provided enabling a Distributed Roaming Technology Architecture (DRTA) that connects multiple radio access carrier networks. In one non-limiting embodiment, a first Distributed Roaming Master (DRM) is included within a first radio access carrier network that authenticates and/or authorizes a roaming User Equipment (UE), which subscribes to a second radio access carrier network, based in part on an analysis of data from a profile associated with the roaming UE. The profile is downloaded from a second DRM within the second radio access carrier network over an IP (Internet Protocol) network.

In another non-limiting embodiment, a method is provided that facilitates communication between home and roaming carrier networks associated with a first user equipment (UE) by employing IP (Internet Protocol)-based messaging. Information associated with the first UE is received from a Distributed Roaming Master (DRM) in a home carrier network of the first UE over an IP network, when the first UE is visiting a roaming carrier network and the information is employed to facilitate any one or more of authentication of the first UE, authorization of the first UE or communication between the first UE and an end-destination over the IP network.

In another non-limiting embodiment, a system enables gateway services to a roaming subscriber user equipment (UE), where mechanism(s) are provided for querying a Distributed Roaming Master (DRM), located within in a home carrier network, over an IP (Internet Protocol) network for information associated with the roaming subscriber UE, the means for querying located within a roaming carrier network, mechanism(s) are provided for receiving and storing the information and mechanisms are provided for analyzing the information to at least one of authenticate or authorize the roaming subscriber UE.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
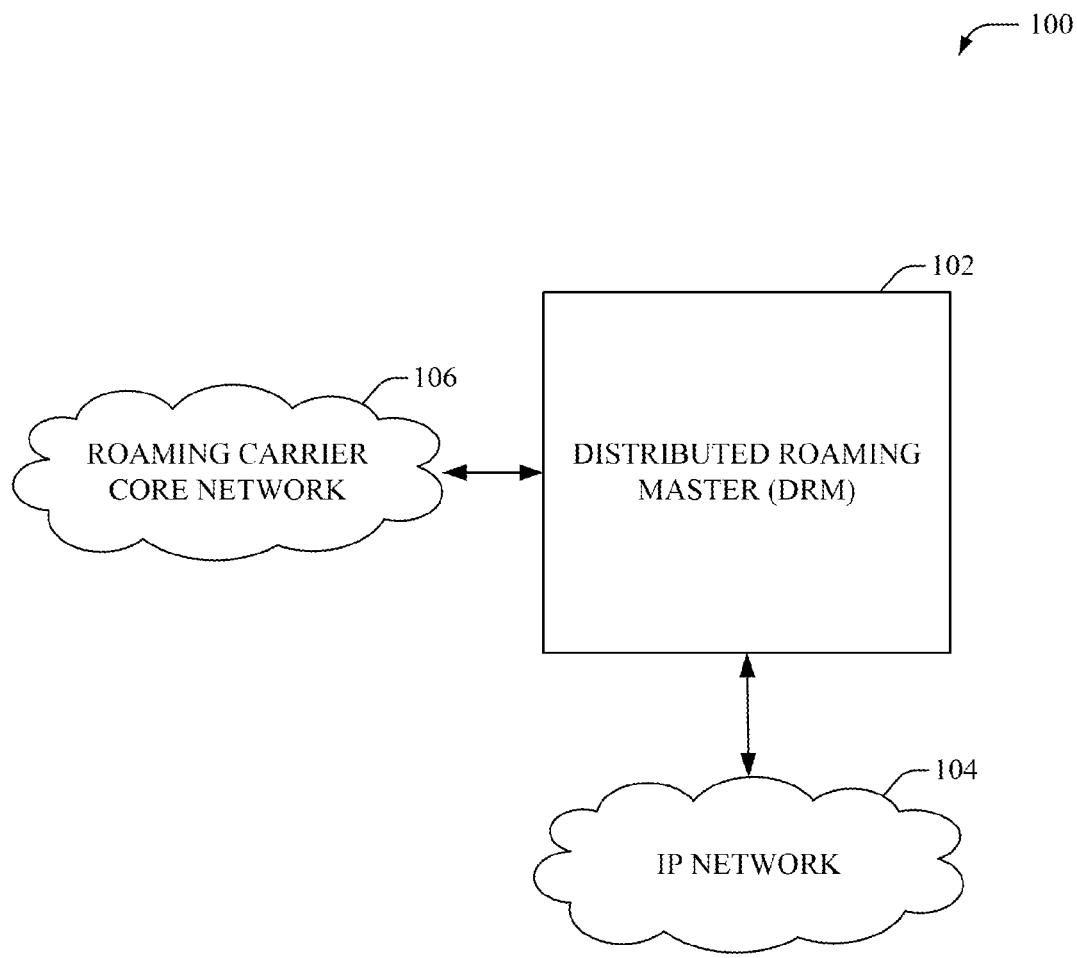
FIG. 1 illustrates an example system that facilitates subscriber authorization and data routing within roaming carrier network, according to an aspect of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system", "interface", "service," "framework," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Further, terms like "user equipment," "mobile equipment," "mobile station," "mobile," "subscriber station," "access terminal," "terminal," "handset," "user device," "subscriber device", and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Furthermore, the terms "user," "subscriber," "customer," "end-user," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

Additionally, the terms "home network," "home carrier network," "home carrier," and the like are employed interchangeably throughout the subject specification, unless specified, and refer to a primary radio access carrier network to which a user equipment UE is subscribed. Similarly, the terms "roaming network," "roaming carrier network," "roaming carrier," and the like are employed interchangeably throughout the subject specification, unless specified, and refer to a secondary radio access carrier network that a UE visits.

Roaming communications and interconnection between network operators is a challenging and complex function. Roaming functionality is extremely useful when subscribers travel outside the geographic coverage of their primary network and ensures that the subscriber can be connected to the primary network while visiting disparate networks. With the advent of 3G networks and the increased popularity in smart phones, the demand for utilization of mobile data services including MMS, GPRS, push email, and mobile broadband services while roaming outside a home carrier network has increased. Traditional systems utilize GRX (Global Roaming Exchange) carriers to provide connectivity based upon best effort between GSM and 3G Mobile Network Operators (end-to-end) whenever bilaterally agreed between those operators. However, GRX relies on an active links between the roaming network elements and the home network elements, for example, during authentication and profile provisioning.

The systems and method disclosed herein utilize a distributed roaming master (DRM) that facilitates interconnection between the roaming and home carrier networks. The DRM employs standard Internet Protocol (IP) based SSL (https, s-http, etc.) messages (not SS7) for communication and performs authentication of end-users, authorization of end-users and and/or routing of data packets to their end-destination. The use of a DRM eliminates the need for roaming carriers to contact home-carriers via SS7 messages. Instead, the roaming carrier can connect to the home carrier via the internet. By using IP-based SSL message as opposed to SS7 messages, carriers can implement elements of the subject architecture using commercial off-the-shelf IP-based servers and thus substantially reduce costs.

The systems and methods disclosed herein, in one aspect thereof, provide a Distributed Roaming Technology Architecture (DRTA) that can facilitate communication between home and roaming radio access carrier networks by employing on IP (Internet Protocol)-based messaging. The DRTA includes a Distributed Roaming Master (DRM) that can provide the core radio access network with an interface to an IP network (e.g., Internet). Moreover, the DRM can receive a message from a network element of the roaming carrier core network when an end-user, which is visiting the roaming carrier network, attaches to the roaming carrier network. In response, the DRM can communicate with a home carrier network of the end-user to retrieve authentication and/or authorization information associated with the end-user, over the IP network. A home network DRM can store end-user roaming profiles that can include a subset of information associated with the end-user and can provide the requested roaming profile via IP-based messaging. The DRM can utilize the received information to authenticate and/or authorize the end-user. Further, the DRM can store the received information in a local data store for future access. Furthermore, the DRM can facilitate routing of data packets between the roaming end-user to end-destination over the IP network, by employing most any secure protocol (e.g., IPSec, SSL, etc.).

In accordance with another aspect of the system, the DRTA architecture employs one or more Distributed Roaming Servers (DRSs), which can perform a limited set of functions performed by the DRM. The DRSs can be distributed at strategic points in a radio access network to improve performance and reduce cost. Moreover, the DRS servers can communicate with the DRM periodically, or on a real-time basis, to update, modify and/or synchronize information. In one aspect, the DRSs can include limited storage functionality and can authenticate/authorize users depending on data downloaded. Similar to the DRM, the DRSs can communicate via IP-based messages and can also employ XML strings over SSL to exchange information. The DRSs can facilitate routing of data packets between a roaming end-user and end-destination via the DRM or directly via the IP network.

Another aspect of the subject innovation comprises a Distributed Roaming Configuration Server (DRCS) that provides a single point of configuration for systems administrators and/or security managers. The DRCS provisions DRMs and/or DRSs in different radio access networks, establishes configuration parameters for communication with roaming partners and/or establishes the security associations and IPsec parameters required to route packets to end-user destinations. The DRCS can communicate with the DRM and DRS servers over the IP network via SSL messages and XML applications peer-to-peer messages. Further, the DRCS can generate a schedule to update and/or synchronize the DRMs and/or DRSs. Moreover, the schedule can provide a periodic update or an update during an optimal time period.

One aspect of the disclosed subject matter relates to a Distributed Roaming Security Catalog (DRSC) for storage of security profiles and/or configuration parameters associated with management of the DRMs and/or DRSs. The DRSC can include provisioning records received from the home-carrier networks. Moreover, the provisioning records can be abbreviated versions of Home Location Register (HLR) records and can comprise a minimum amount of essential information. The records can be updated on a schedule/periodic basis or on-demand as driven by the home carrier via IP-based communications. In one aspect, the DRCS can utilize the records to facilitate management and/or configuration of the DRMs and/or DRSs of radio access networks.

Yet another aspect of the disclosed subject matter relates to a method that facilitates communication between a home and roaming carrier network by employing IP-based messaging. The method comprises receiving a message from a Serving GPRS Support Node (SGSN) regarding a roaming UE (user equipment) and in response, determining authentication and/or authorization for the roaming UE based on a roaming profile of the UE. The roaming profile can be downloaded, for example, from a local database or from a DRM in the home carrier network if the roaming UE over an IP network. Further, routing of data packets for communication between the roaming UE and end-user enterprise servers can be facilitated over the IP network based on data from an Access Point Name (APN) profile (e.g., retrieved from the local database or home carrier DRM). Additionally, security attributes can be utilized to establish a network to network virtual private network (NTN-VPN) via the IP network and deliver data packets to the end-destination securely.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates subscriber authorization and data routing within roaming carrier network, according to an aspect of the subject disclosure. Moreover, a roaming carrier network can be most any communication network, typically outside the geographical coverage area of the home carrier network, to which a UE (user equipment) can connect. Most often, when a subscriber travels outside the range of his home carrier network, the subscriber can connect to the home carrier network via an available roaming carrier network. It can be appreciated that the roaming carrier network is not limited to having a coverage area outside the range of the home carrier network. In one example, the coverage area of the home and roaming carrier networks can overlap (e.g., UE can utilize roaming network resources to avoid congestion on the home carrier network). As an example, system 100 can be implemented in a roaming carrier network. Additionally and/or alternately, a substantially similar system can be implemented in the home carrier network.

Typically, most network service providers have a pre-defined roaming agreement with disparate network providers, for example network providers in different geographical locations. Based in part on the roaming agreement, when a subscriber travels into the coverage area of the roaming carrier network, the roaming carrier network can allow the subscriber to make and receive voice calls, send and receive data, or access other services, including home data services, when travelling outside the geographical coverage area of the home network, by means of utilizing the recourses of the roaming visited network.

Roaming is technically supported by mobility management, authentication, authorization and/or billing procedures. When the subscriber registers with the roaming network, subscriber data for authentication and/or authorization can be retrieved by the roaming carrier network, for example, from a database of the home carrier network. As discussed above, in traditional systems, network elements of the roaming carrier network employ active links (e.g., via SS7) to receive subscriber data from a Home Location Register (HLR) in the home carrier network. However, system 100 utilizes a Distributed Roaming Master (DRM) 102 to interface the roaming and home carrier networks.

System 100 employs a Distributed Roaming Technology Architecture (DRTA) that facilitates communication and interoperability between roaming and home network carriers. According to an aspect, system 100 does not to rely on global roaming exchange (GRX) links for authorization and routing. Instead, the system 100 includes a DRM 102 that can interface with an IP network 104 and communicate with a home carrier network via most any secure protocol, (e.g., IPSec, SSL, etc.)

At a high level, a roaming carrier core network 106 that can include a router element, such as but not limited to, a Serving GPRS Support Node (SGSN) can identify when an end-user attaches to the roaming carrier network. According to one aspect, the roaming carrier core network 106 can send a message to the DRM 102 using standard IP-based messages, such as but not limited to Secure Sockets Layer (SSL), secure-HTTP (s-http), HTTP-secure (https) (etc. This is one of the differences from the conventional approach, because the roaming carrier core network 106 can communicate with a local DRM 102 instead of a home carrier HLR. In one aspect, the DRM 102 can reside in the roaming carrier's core mobility network. Alternately, the DRM 102 can be located at a central location hosted by a third party, which can be shared by multiple roaming partners.

According to an embodiment, the DRM 102 can receive a message from the roaming carrier core network 106 (e.g., a SGSN) when the end-user attaches to the roaming carrier network. Further, the DRM 102 can interface with an IP network 104, for example, the Internet, and communicate with a home carrier network to retrieve authentication and/or authorization information associated with the end-user. As an example, the DRM 102 can communicate with a home carrier network DRM (not shown) to receive end-user data. Typically, the home carrier network DRM can store end-user roaming profiles that can include a subset of information associated with the end-user usually stored in the home carrier HLR. The DRM 102 can utilize the received information to validate and/or authorize the end-user to access the roaming carrier network. Additionally, the DRM 102 can store the received information as a roaming profile for the end-user. Once the profile is stored at the DRM 102, authentication and/or authorization information can be locally accessed each time the end-user attaches to the roaming carrier network. In one aspect, the profile can be downloaded to the DRM 102 prior to the end-user accessing the network, for example, periodically and/or based on a schedule.

According to another embodiment, once the end-user is authenticated and authorized to employ the roaming carrier network, the DRM 102 can also facilitate routing of data packets to their end-destination via the IP network 104. It can be appreciated that the data packets can include, but are not limited to, voice, video, and/or data. In one example, the routing of data packets can include real-time and/or live streaming of audio, video and/or other data. As an example, the DRM 102 can employ IP-based SSL messages (as opposed to SS7 messages), to route data packets to and from the end-user. Accordingly, service providers can implement elements of system 100 by employing most any commercial off-the-shelf IP-based servers, which can be affordable and readily available.

In an aspect, the DRM 102 can be provisioned by roaming and/or home carriers and can store an abbreviated set of end-user profiles that facilitate authentication and authorization of services and/or UEs. It can be appreciated that this set of profiles can be updated periodically, and/or on demand. Further, the DRM 102 can determine and/or store roaming billing records associated with roaming end-users. Furthermore, the DRM 102 can also determine and/or enable a network service provider to apply, update, cancel, and/or modify a Quality of Service (QoS) priority associated with the data packet communication, as explained in detail infra.

Figure 2:
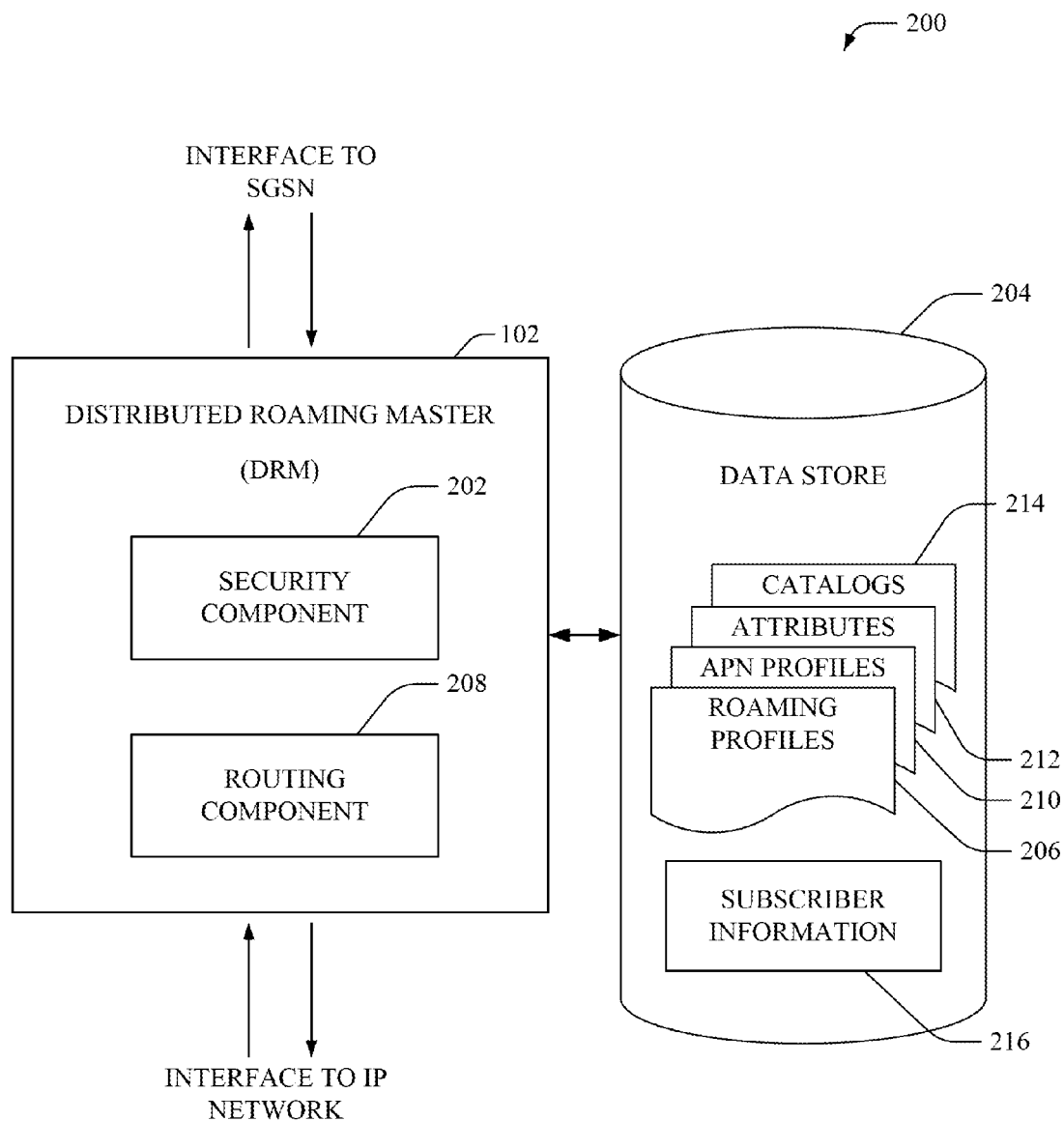
FIG. 2 illustrates an example system that includes a distributed roaming master (DRM), which facilitates communication between disparate radio carrier networks in accordance with an aspect.

Referring now to FIG. 2, there illustrated is an example system 200 that includes a distributed roaming master (DRM) 102, which facilitates communication between disparate radio carrier networks in accordance with an aspect of the disclosed subject matter. Typically, the DRM 102 can be a gateway that interfaces with an IP-based network, for example, the Internet. As noted previously, the DRM 102 can facilitate communication between two or more carrier networks via a secure communication protocol, such as, but not limited to, IPSec, SSL, etc. Further, the DRM 102 can facilitate improved performance by enabling faster authorization/authentication/routing for end-users. It can be appreciated that the DRM 102 can include functionality, as more fully described herein, for example, with regard to system 100. The DRM 102 is the centerpiece of the Distributed Roaming Technology Architecture (DRTA) disclosed herein. Specifically, the DRM 102 can store roaming profiles for all home carriers and perform authentication and/or authorization functions for roaming users.

According to an embodiment, the DRM 102 can include a security component 202 that can retrieve roaming profiles associated with a roaming subscriber from the subscriber's home carrier network. It can be appreciated that the term "roaming subscriber" used herein refers to a subscriber of a communication device, who is visiting and attempting to access a roaming carrier network. In an aspect, when the DRM 102 receives a message from a SGSN to authenticate and/or authorize a newly attached roaming subscriber, the security component 202 can initially lookup a data store 204, which can be operatively connected to the DRM 102, to determine if a roaming profile 206 associated with the roaming subscriber exists locally. If a roaming profile 206 associated with the subscriber is found, the security component 202, analyzes the roaming profile 206 and employs the information within the roaming profile 206 to authenticate and/or authorize the subscriber. In another example, when a roaming profile 206 associated with the roaming subscriber is not found locally, the security component 202 communicates over the Internet (e.g., employing IPSec, SSL, etc.) with an element in the subscriber's home carrier network, for example, a home carrier DRM (not shown). The security component 202 can receive profile information for the roaming subscriber from the roaming subscriber's home carrier network and store the profile information in the data store 204. It can be appreciated that the profile information can be a subset of information associated with a subscriber stored in a home carrier HLR. Further, the security component 202 authenticates and/or authorizes the roaming subscriber based in part on the received information.

The DRM 102 can also perform a routing function by employing a routing component 208. In the conventional architecture defined by 3GPP, Gateway GPRS Support Nodes (GGSNs) are provisioned to route packets to end-user destinations. However, in the disclosed DRTA, the routing component 208 can be provisioned to route end-packets directly to end-destinations bypassing the need to contact the GGSN for routing services. The data store 204 can include Access Point Name (APN) profiles 210 that can be utilized by the routing component 208 to allow data packets to be routed to end-destinations via the IP network. It can be noted that the APN profiles 210 in the data store 204 can be updated periodically and/or on demand.

Further, the routing component 208 determines whether a network-to-network virtual private network (NTN-VPN) is requested, and establishes, via the IP network, a NTN-VPN by employing security attributes 212. In one example, the routing component 408 delivers data packets to the end-destination securely over the NTN-VPN. The consolidated authentication, authorization and end-routing functions over standard IP-based messaging, performed by the DRM 102, avoid communication with an HLR and/or GGSN of the roaming subscriber's home carrier network. In one example, when information associated with the roaming subscriber, such as, but not limited to, a roaming profile 206, an APN profile 210, security attributes 212 and/or catalogs 214 are downloaded into the data store 204, the DRM 102 can enable roaming functions without accessing the home carrier network. Thus, system 200 can be "self-contained" and can enable roaming carrier networks to authenticate and route data packets without communicating with home carrier networks via live links.

In one aspect, at the application layer, the DRM 102 can employ Extensible Markup Language (XML) to transfer data between the DRM 102 and an SGSN. As an example, the messages can contain numeric challenges and/or expected responses in order to authenticate roaming subscribers. The data store 204 can also store a catalog 214 of finite number of challenges and expected responses for each roaming subscriber. Therefore, sharing of a SIM (Subscriber identity Module) key between home and roaming carriers can be avoided and the system can be more secure. The catalog 214 of finite set of authentication challenges and/or expected response can be provisioned by disparate home carrier networks of the roaming subscribers on a periodic basis, when the network is available, or on demand. In particular, the routing component 208 can utilize the locally stored catalog of challenges and/or expected responses to authenticate a roaming subscriber that registers with or access the carrier network of system 200. Accordingly, the system 200 can achieve a fast response time and improved performance. In an additional aspect, the data store 204 can store information 216 associated with subscribers of the roaming carrier network, including but not limited to roaming profiles 206, attributes 212, APN profiles 210, catalogs 214, etc. Moreover, the security component 202 can provide (e.g., periodically or on demand) the subscriber information 216, to a DRM in a disparate carrier network over the IP network, when the subscribers of the roaming carrier network visit the disparate carrier network.

It can be appreciated that the data store 204 described herein can enable business continuity, since elements in the roaming carrier network (e.g., DRM 102) can access data from the local data store 204 and continue operations even in the event of a loss of connectivity to the home carrier network. Typically, the data store 204 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 3A:
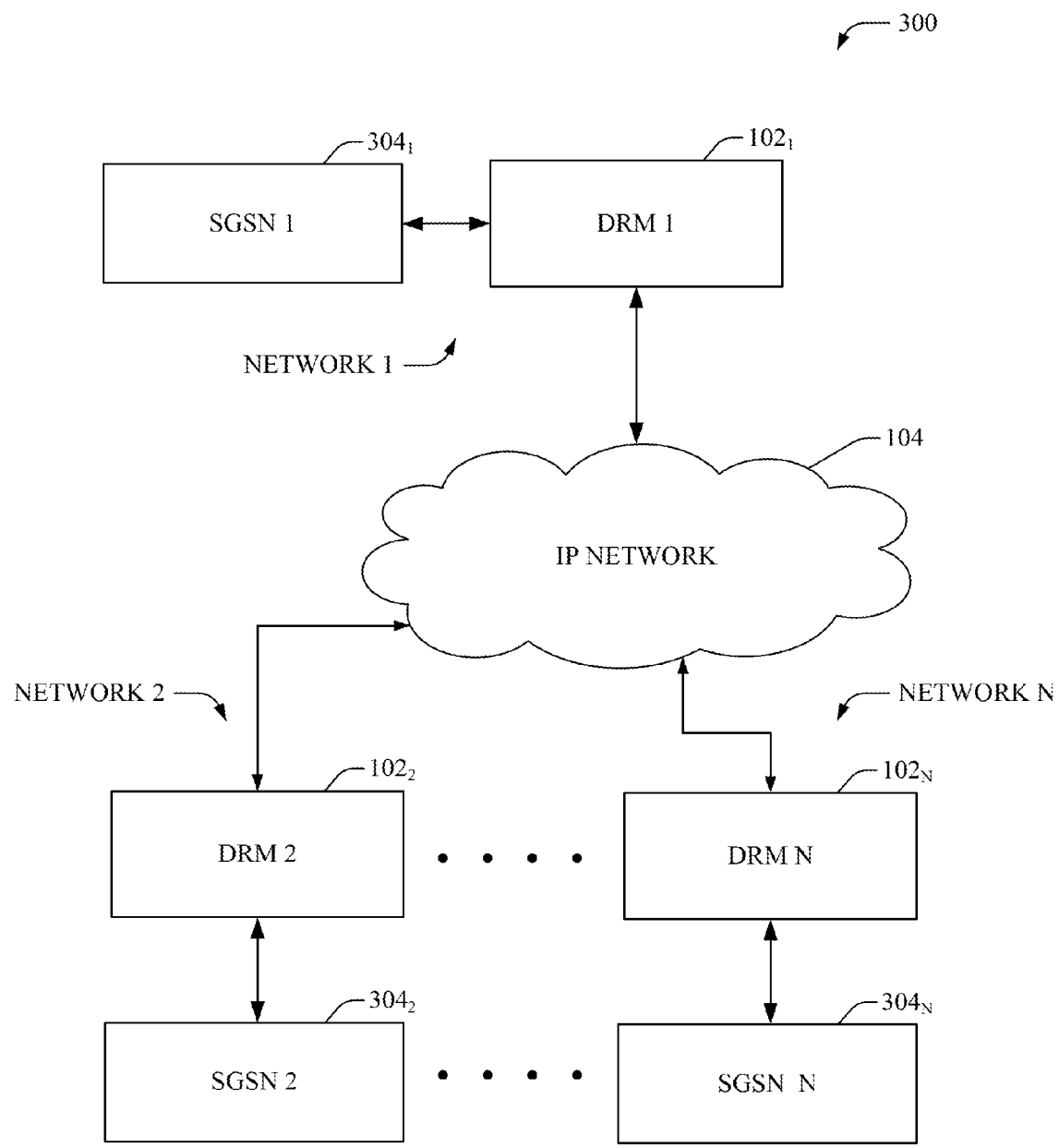
FIGS. 3A and 3B illustrate different network architectures that facilitate connectivity between roaming and home carrier networks, according to an aspect.
Figure 3B:
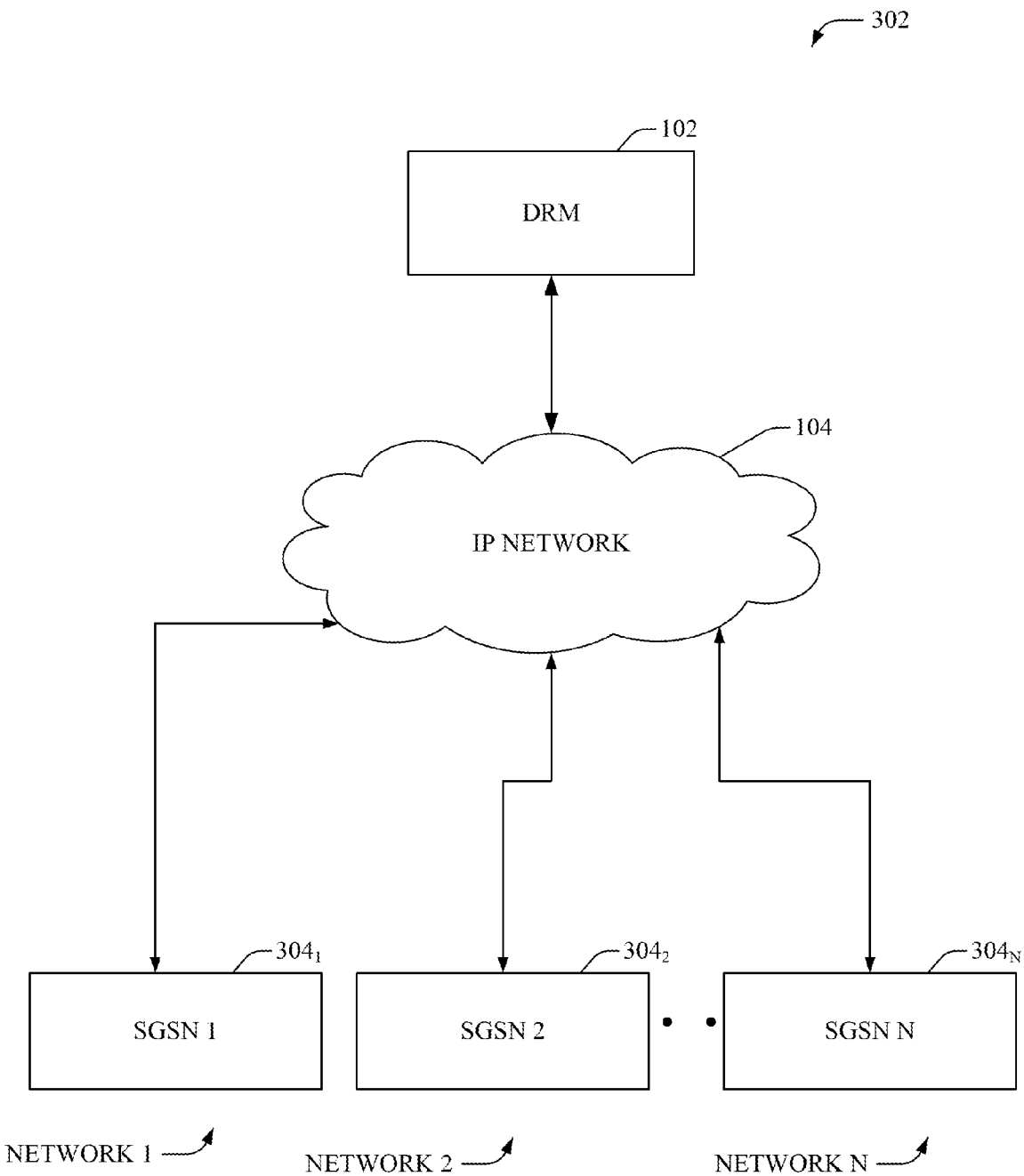

FIGS. 3A and 3B illustrate different network architectures that facilitate connectivity between roaming and home carrier networks, according to an aspect of the disclosed innovation. Turning to FIG. 3A, there illustrated is a distributed roaming technology architecture 300 that can facilitate connectivity between radio access carrier networks 1 to N (where N can be a natural number from two to infinity). Further, FIG. 3B illustrates an alternate architecture 302 that utilizes a common DRM 102 to facilitate connectivity between the radio access carrier networks 1 to N. The network elements and methods disclosed herein can implement authentication/routing functions in a distributed manner, which can be tailored to the specific network architecture of the roaming carrier network. It can be appreciated that the DRMs (102, 102$_{1-N}$) can each include their respective functionality, as more fully described herein, for example, with regard to systems 100 and 200.

The systems 300 and 302 illustrate SGSNs (304$_{1-N}$) of various carrier networks that can interface with one or more disparate carrier networks by employing a DRM (102, 102$_{1-N}$). Typically, each carrier network can include a coverage area that spans across different geographical locations. For example, Network 1 can be a service provider in Unites States of America and the coverage area of Network 1 can span the entire country. Further, Network 2 can cover Canada, while Network N can cover the United Kingdom. It can be appreciated that the coverage areas of the carrier networks of the subject innovation are not limited to span countries but can vary in size and cover most any geographical region and/or can overlap.

In general, systems 300 and 302 can provide connection between different radio access networks based in part on a predefined contract and/or agreement. Accordingly, when subscribers of a first carrier network travel into a coverage area of a second carrier network, the subscribers can access the second carrier network to communicate with the home carrier network, for example, make and/or receive calls, download content, services, etc.

Referring to FIG. 3A, in one aspect, each Network 1-N can include a DRM ($102_{1-N}$), as shown in system 300, which can provide an interface with an IP network 104 (e.g., Internet). The DRMs ($102_{1-N}$) can retrieve subscriber data from the subscriber's home carrier DRM and locally store the roaming profile associated with the subscriber. When a subscriber roams in an area serviced by a roaming carrier network which is not its home-based contracted carrier, the DRM of the roaming carrier network can access the locally stored roaming profile for the subscriber to facilitate authorization and/or authentication of subscriber. If the roaming profile is not locally available, the DRM of the roaming carrier can query the DRM of the home-based contracted carrier to retrieve the roaming profile associated with the subscriber via the IP network 104. Moreover, the DRMs ($102_{1-N}$) can communicate with each other by employing most any secure IP-based protocol, such as but not limited to, IPSec, SSL, etc. Further, DRM of the roaming carrier can facilitate routing of data packets between the subscriber UE and the end-destination, for example on the home network.

As an example, a UE (not shown), which subscribes to Network 1, can roam in the coverage area of network 2. The roaming UE can connect to a Radio Network Subsystem (RNS) of Network 2, serviced by the SGSN 2 ($304_2$), which in turn can communicate with the DRM 2 ($102_2$) to identify the UE and/or determine whether the UE is authorized to access the Network 2. Specifically, the DRM 2 ($102_2$) can search its local database for the roaming profile associated with the UE. If found, the DRM 2 ($102_2$) can utilize the UE's roaming profile to authenticate and/or authorize the UE. Further, the DRM 2 ($102_2$) can also facilitate routing data packets to/from the UE over the IP network 104 by employing standard IP-based messaging.

If the DRM 2 ($102_2$) cannot locate the UE's roaming profile locally, the DRM 2 ($102_2$) can query the DRM 1 ($102_1$) via the IP network 104 by employing secure IP-based messaging to retrieve the roaming profile from the DRM 1 ($102_1$). Moreover, the DRM 2 ($102_2$) can utilize the retrieved data to authenticate and/or authorize the UE. Further, the DRM 2 ($102_2$) can employ standard IP-based messaging to route data packets from the UE to the Network 1 over the IP network 104 and vice versa.

FIG. 3B illustrates a roaming technology architecture 302 that employs a common DRM 102. In one example, a third party can provision and/or operate the common DRM 102. According to an aspect, when a subscriber roams in an area serviced by a carrier network, which is not its home-based contracted carrier, for example, a roaming carrier network, the common DRM 102 can provide the roaming SGSN ($304_{1-N}$) with authorization and/or authentication information of the subscriber. The common DRM 102 can store a set of roaming profile for the subscribers of the Networks 1-N, which can facilitate authorization and/or authentication of subscriber when in a roaming carrier network. If the roaming profile for a subscriber is not stored in the common DRM 102 (or stored on a database local to the DRM 102), the DRM 102 can retrieve the roaming profile associated with the subscriber from its home-based contracted carrier via the IP network 104. In addition, the common DRM can utilize APN profiles to facilitate communication between an authorized subscriber UE and the end-destination.

For example, a UE (not shown), which subscribes to Network 1, can roam in the coverage area of Network 2 and attach to the RNS of Network 2. Moreover, SGSN 2 ($304_2$) can exchange messages with the common DRM 102 via a secure IP based protocol to determine whether the UE is authorized to access Network 2. The DRM 102 can validate the identity and/or determine the authorization of the UE by employing a roaming profile associated with the UE. Moreover, the roaming profile can be downloaded to the DRM 102 at a prior time or in real time. Once authorized and/or authenticated, the DRM 102 can facilitate communication of data packets between the UE and the home carrier network over the IP network 104.

Figure 4:
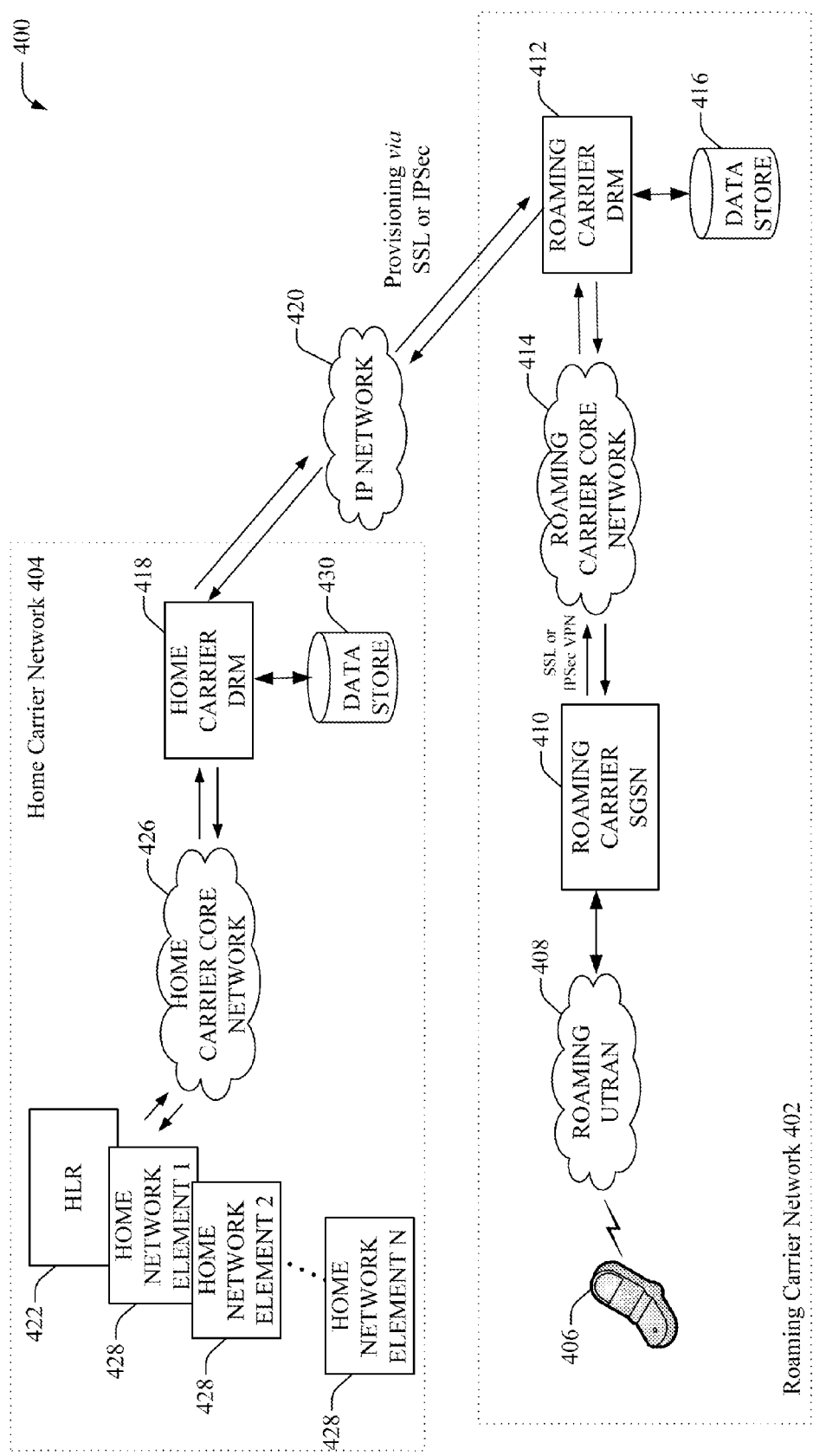
FIG. 4 illustrates an example system that can be employed to facilitate authorization and/or authentication for a subscriber UE, visiting a roaming carrier network, according to an aspect.

Referring now to FIG. 4, there illustrated is an example system 400 that can be employed to facilitate authorization and/or authentication for a roaming UE 406 visiting a roaming carrier network 402, according to an aspect of the disclosed subject matter. Typically, an agreement, for example, a predefined contract, exists between the roaming carrier network 402 and the home carrier network 404 that allows connectivity and enables users of one network to access and roam within the other network. In one example, the roaming carrier network 402 and the home carrier network 404 can include service areas that span across different geographical regions. It can be appreciated that roaming carrier SGSN 410, and data stores 416, 430 can each include their respective functionality, as more fully described herein, for example, with regard to SGSN $304_{1-N}$ (FIGS. 3A and 3B) and data store 204 (FIG. 2) respectively. Further, roaming carrier DRM 412 and home carrier DRM 418 can be substantially similar to the DRM 102 and include functionality, as more fully described herein, for example, with regard to systems 100, 200, 300, and 302.

According to an embodiment, a UE 406 that subscribes to the home carrier network 404 can travel into a coverage area of the roaming carrier network 402 and connect to the roaming UTRAN (UMTS Terrestrial Radio Access Network) 408. It can be appreciated that the UE 406, although depicted as a mobile phone, can include most any device employed by the subscriber, such as, but not limited to, a cellular phone, a personal digital assistant (PDA), a laptop, a personal computer, a media player, a television, a gaming console, a premise device, and the like. Typically, a roaming carrier SGSN 410 can be responsible for the delivery of data packets from and/or to the UEs within its geographical service area. For a non-roaming UE (not shown) the roaming carrier SGSN 410 can perform packet routing and transfer, within the roaming carrier network 402, and/or authentication functions. The authentication can be preformed based in part on user profile data stored in a location register of the roaming carrier SGSN 410. However, the location register does not contain profiles for roaming UEs (e.g., UE 406).

In accordance with an aspect, to facilitate authentication and/or authorization of the UE 406, the roaming carrier SGSN 410 communicates with a roaming carrier DRM 412 over an internal roaming carrier core network 414. In one example, the communication can be based on most any IP based messaging, such as but not limited to, SSL or IPSec VPN. The roaming carrier DRM 412 searches a local data store 416 to determine a roaming profile for the UE 406. Typically, the data store 416 can be updated with roaming UE profiles periodically, for example, by DRMs associated with different carrier networks. For example, a home carrier DRM

418 can periodically (e.g., nightly, weekly, monthly, etc.) update the data store 416 with a roaming profile for UE 406. If the roaming profile for UE 406 is available in the data store 416, the roaming carrier DRM 412 can directly utilize data from the roaming profile to authenticate and/or authorize the UE 406. Accordingly, a fast response time can be achieved. In one aspect, a user and/or network operator can schedule an update or send a roaming profile (or other data) from the home carrier DRM 418 to the roaming carrier DRM 412. For example, if known that a user is traveling to London, the user and/or the home network operator can ensure that a roaming profile is sent to a roaming DRM of a roaming carrier network in London, in advance. Accordingly, the roaming DRM can utilize the locally stored roaming profile when the user accesses the roaming carrier network to authenticate and/or authorize the user, and save time required to fetch the roaming profile from the home carrier DRM.

In another aspect, when the roaming profile for UE 406 is not available in the data store 416, the roaming carrier DRM 412 can communicate with the home carrier DRM 418 to retrieve the roaming profile for UE 406. In particular, the communication between the roaming carrier DRM 412 and the home carrier DRM 418 can be over an IP network 420 (e.g., Internet) by employing most any secure IP-based protocol (e.g., IPSec, SSL, etc.). Moreover, the home carrier DRM 418 can store roaming profiles for its subscribers and/or retrieve roaming profiles from a home network element, for example, in data store 430 and/or HLR 422 over the home carrier core network 426. In one example, the roaming profiles can include a subset of data associated with a UE 406 from the HLR 422 that can be sufficient to authenticate and/or authorize the UE 406 in a roaming carrier network 402. In particular, the data store 416 can receive the roaming profile from the home carrier DRM 418 and store the roaming profile locally to avoid fetching the roaming profile again.

The roaming carrier DRM 412 can utilize the roaming profile to validate the identity of the UE 406 and authorize the UE 406 to access the roaming carrier network 402 (e.g., by employing security component 202). Once authorized, the roaming carrier DRM 412 can facilitate communication between the UE 406 and most any home network element (1-N) 428 via the IP network 420. It can be appreciated that the roaming carrier DRM 412 can utilize information from an APN profile (stored in the data store 416 or retrieved from the home carrier DRM 418) associated with the UE 406 to facilitate routing of data packets between the UE 406 and most any end device on the home carrier network 404.

Figure 5:
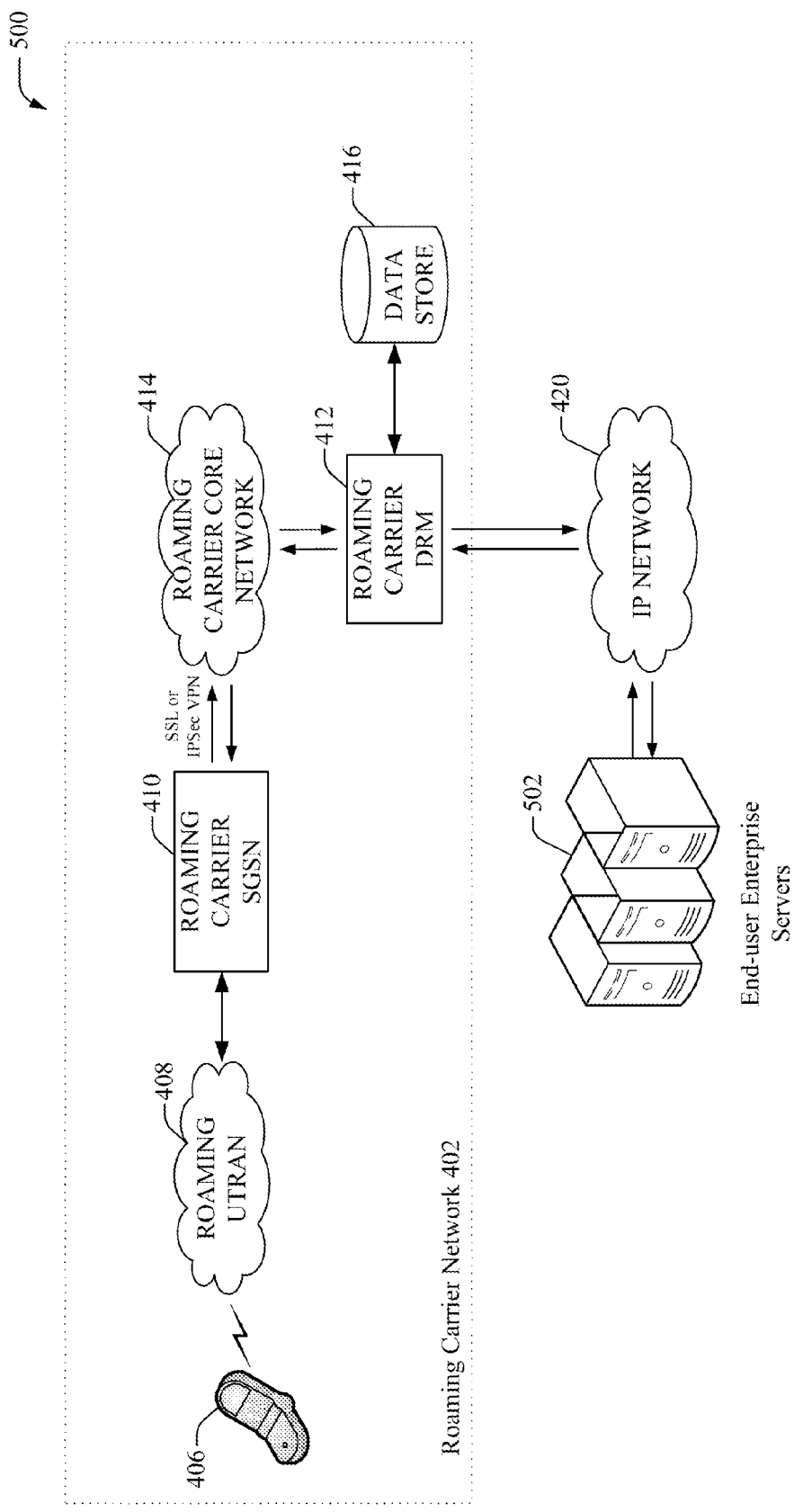
FIG. 5 illustrates an example system that can be employed to provide gateway services to a roaming subscriber UE, in accordance with an aspect.

FIG. 5 illustrates an example system 500 that can be employed to provide gateway services to a roaming UE 406, in accordance with an aspect of the disclosure. It can be appreciated that UE 406, roaming UTRAN 408, roaming carrier SGSN 410, roaming carrier core network 414, roaming carrier DRM 412, data store 416 and IP network 420 can each include their respective functionality, as more fully described herein, for example, with regard to system 400.

As discussed previously, the roaming carrier DRM 412 can utilize data from a roaming profile to identify and/or verify identity of roaming UE 406 connected to the roaming carrier network 402. Additionally, the roaming carrier DRM 412 can determine whether the roaming UE 406 is authorized to access the roaming carrier network 402 based on the data in its roaming profile. According to one aspect, the roaming carrier DRM 412 can also facilitate communication between the authorized roaming UE 406 and one or more end-user enterprise servers 502. Moreover, the roaming carrier DRM 412 can interface with the end-user enterprise servers 502 via an IP interface, for example, IP network 420.

In accordance with an aspect, the roaming carrier DRM 412 can determine an APN profile associated with the roaming UE 406. For example, the APN profile can be stored in data store 416 or can be dynamically retrieved from a home carrier DRM. The roaming carrier DRM 412 (e.g., by employing a routing component) can communicate with end-user enterprise servers 502 directly, bypassing contact with the home-GGSN for routing services. In one example, the APN profiles can be utilized by the roaming carrier DRM 412 to enable routing of data packets to/from end-user enterprise servers 502 via the IP network 420.

In another aspect, the DRM 412 can utilize security attributes stored in the data store 416 to establish via the IP network 420 a NTN-VPN and deliver data packets to the end-destination securely. As an example, this communication can enable the roaming UE 406 to access most any data and/or service on the home carrier network. It can be appreciated that the security attributes can be updated by a home carrier DRM, periodically, on demand or at any time when network traffic is low. Accordingly, the roaming carrier DRM 412 can perform end-routing functions over standard IP-based messaging, in addition to the authentication, authorization functions and thus provide a "self-contained" architecture that does not communicate with a home carrier HLR and/or GGSN via Global Roaming eXchange (GRX). Further, it can be appreciated that the communication facilitated by the roaming carrier DRM 412 can include, but is not limited to, audio, video, multimedia, real time, and/or streaming content.

Figure 6:
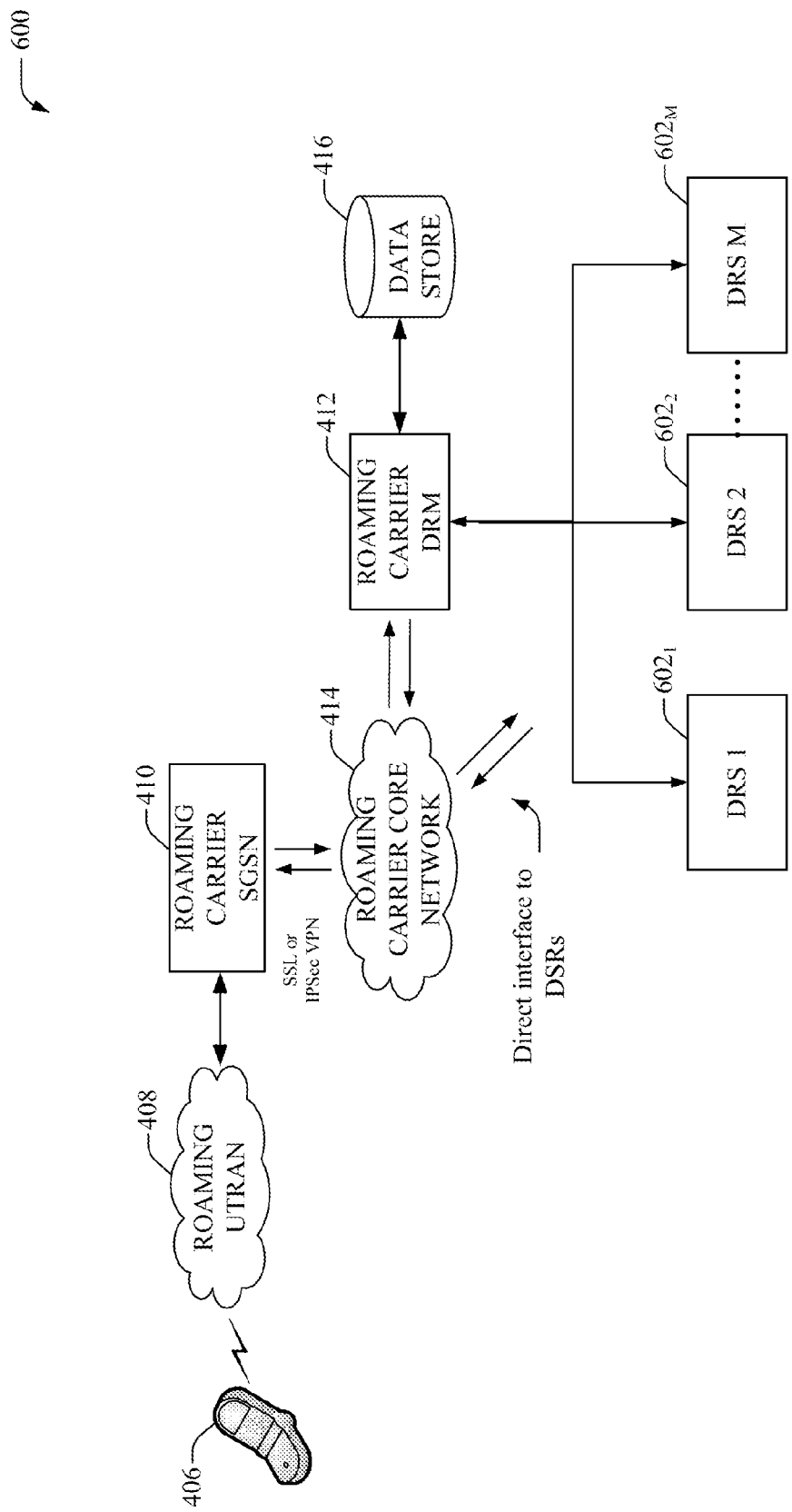
FIG. 6 illustrates an example system that can employ Distributed Roaming Servers (DRSs) in a distributed roaming technology architecture in accordance with an aspect.

Referring to FIG. 6, there illustrated is an example system 600 that can employ Distributed Roaming Servers (DRSs) in a distributed roaming technology architecture in accordance with an aspect of the disclosed subject matter. Specifically, system 600 can include one or more DRSs 1-M ($602_{1-M}$), where M can be an integer from one to infinity. Moreover, the DRSs 1-M ($602_{1-M}$) can be provisioned and implemented by the roaming carrier network and/or a third party. It can be appreciated that UE 406, roaming UTRAN 408, roaming carrier SGSN 410, roaming carrier core network 414, roaming carrier DRM 412, and data store 416 can each include their respective functionality, as more fully described herein, for example, with regard to systems 400 and 500. It can further be appreciated that although the system 600 depicts a roaming carrier network, a substantially similar system can be provisioned and implemented in the home carrier network.

Typically, the DRSs 1-M ($602_{1-M}$) can be smaller hosts that perform a limited (and/or complete) set of functions performed by the roaming carrier DRM 412. One advantage of implementing DRS-based services is that roaming carriers can distribute servers at strategic points in their network architecture to improve performance and reduce cost. According to an aspect, the DRSs 1-M ($602_{1-M}$) can communicate with the roaming carrier DRM 412 either on a real-time basis or on a periodic basis, as needed. Further, the DRSs 1-M ($602_{1-M}$) can include a database that can store a copy of a set of roaming profiles, APN profiles, catalogs, and/or security attributes from the data store 416. In one aspect, the DRSs 1-M ($602_{1-M}$) can query the roaming carrier DRM 412 for data associated with a roaming UE 406 (e.g., roaming profile). If the roaming carrier DRM 412 locates the requested data in the data store 416, the requested data can be returned to the DRSs 1-M ($602_{1-M}$). Else, if the requested data is not available in the data store 416, the roaming carrier DRM 412 can retrieve the data from a home carrier DRM (not shown) over an IP network. Moreover, the DRSs 1-M ($602_{1-M}$) can authenticate and/or authorize the roaming UE 406 based on data downloaded.

The DRSs 1-M (602$_{1-M}$) can be located at different geographical locations in the roaming carrier network based on distance and/or network traffic. In particular, each DRS 1-M (602$_{1-M}$) can interface with the roaming carrier core network and communicate with a roaming carrier SGSN 410, for example, via SSL, XML strings over SSL, or IPSec VPN messages. Further, each DRS 1-M (602$_{1-M}$) can interface with the roaming carrier DRM 412. In one aspect, each DRS 1-M (602$_{1-M}$) can facilitate routing data packets to/from the roaming UE 406. For example, the roaming carrier SGSN 410 can communicate with DRS 1 (602$_1$), via SSL or IPSec VPN messages, such that DRS 1 (602$_1$) can authenticate and/or authorize the roaming UE 406. Further, in one embodiment, the DRS 1 (602$_1$) can connect to the IP network through the roaming carrier DRM 412 to route data packets between the roaming UE 406 and an end-destination. In an additional or alternate embodiment, the DRS 1 (602$_1$) can connect directly to the IP network and servers communicate via secure IP-based messages.

In one aspect, the DRSs 1-M (602$_{1-M}$) can communicate with each other, for example, to share load and/or traffic. For example, DRS 1 (602$_1$) can retrieve a roaming profile from DRSs 2-M (602$_{2-M}$), if the roaming carrier DRM 412 is busy and/or unavailable. It can be appreciated that the DRSs 1-M (602$_{1-M}$) can utilize a priority/proximity scheme and/or load balancing mechanism to share or transfer load.

Figure 7:
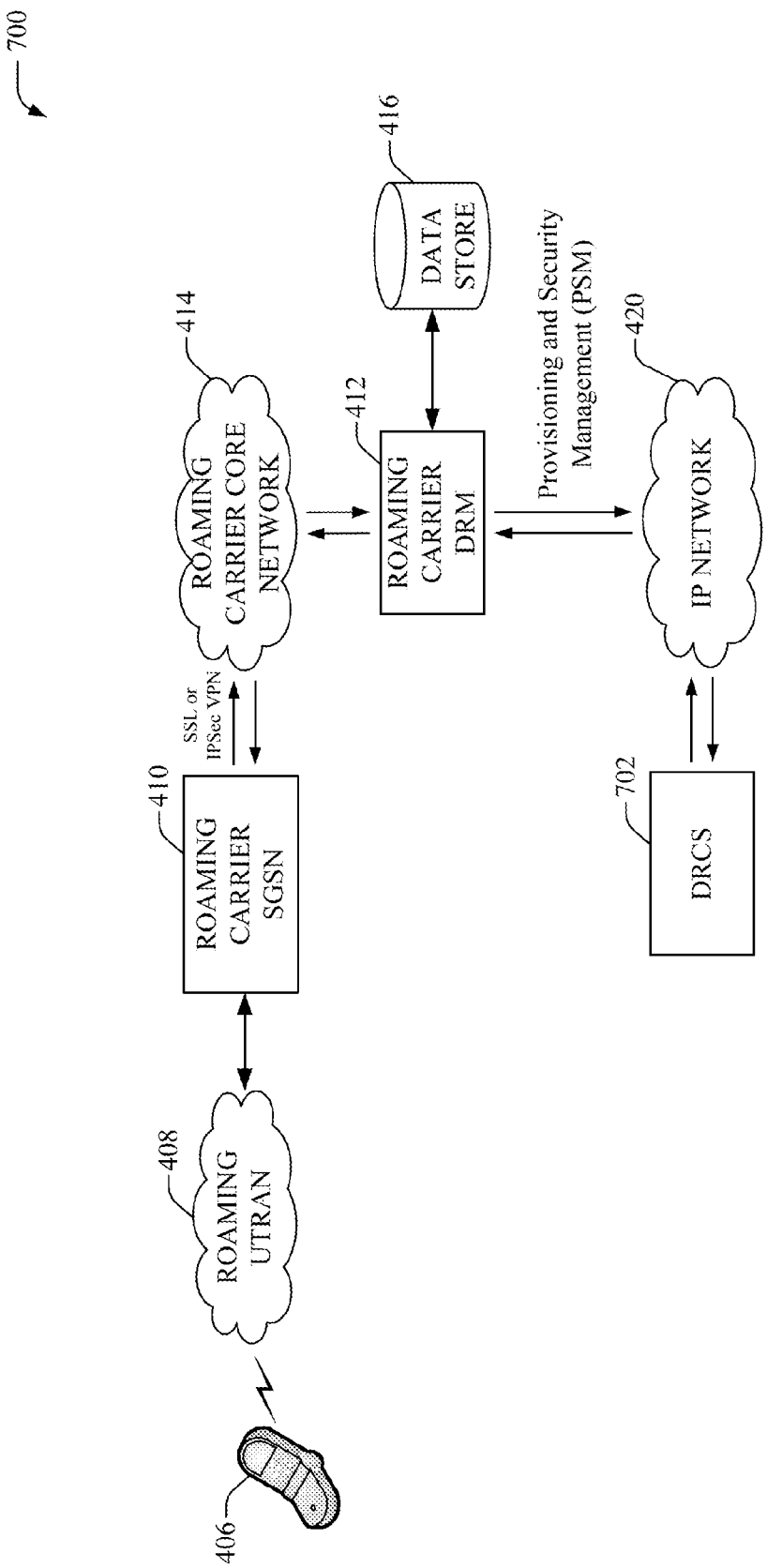
FIG. 7 illustrates an example system that facilitates management and configuration of a distributed roaming architecture, according to an aspect.

FIG. 7 illustrates an example system 700 that facilitates management and configuration of a distributed roaming architecture, according to an aspect of the subject innovation. Typically, system 700 includes a Distributed Roaming Configuration Server (DRCS) 702 that can manage of one or more DRMs in one or more carrier networks. It can be appreciated that UE 406, roaming UTRAN 408, roaming carrier SGSN 410, roaming carrier core network 414, roaming carrier DRM 412, and data store 416 can each include their respective functionality, as more fully described herein, for example, with regard to systems 400, 500, and 600.

In accordance with an aspect, the DRCS 702 can provide a single point of configuration and/or management for system administrators, network operators and/or security managers. The DRCS 702 can provision the DRM (e.g., roaming carrier DRM 412) and/or DRS servers (not shown). It can be appreciated that authorized personnel (e.g., system administrators, network operators and/or security managers) can access the DRCS 702, remotely or locally, via most any user interface. Further, the DRCS 702 can establish configuration parameters for communication with roaming carrier networks and can establish the security associations and IPSec parameters required to route packets to end-user destinations by bypassing the home carrier GGSNs. According to an aspect, the DRCS 702 can interface with an IP network 420 (e.g., Internet) and can communicate with the DRM and DRS servers via IP-based messages, such as but not limited to, SSL messages and XML applications peer-to-peer messages.

Because the configuration of these the DRM and DRS servers can be administered remotely, the DRCS 702 can reside anywhere in the roaming carrier core mobility network. In one aspect, the DRCS 702 can store preferences, policies and/or organization schemes that facilitate management of the DRMs and DRSs. As an example, the DRCS 702 can determine and implement a schedule to update and/or synchronize the DRMs and/or DRSs. Moreover, the updates can be periodic—at a specified time, for example, at midnight, once a week, once a month, etc. Additionally or alternately, the updates can be scheduled at a time when network traffic is below a predefined threshold or when the network is idle. Further, the DRCS 702 can implement one or more security schemes that can restrict the exchange data between carrier networks and/or between the DRMs and DRSs.

Figure 8:
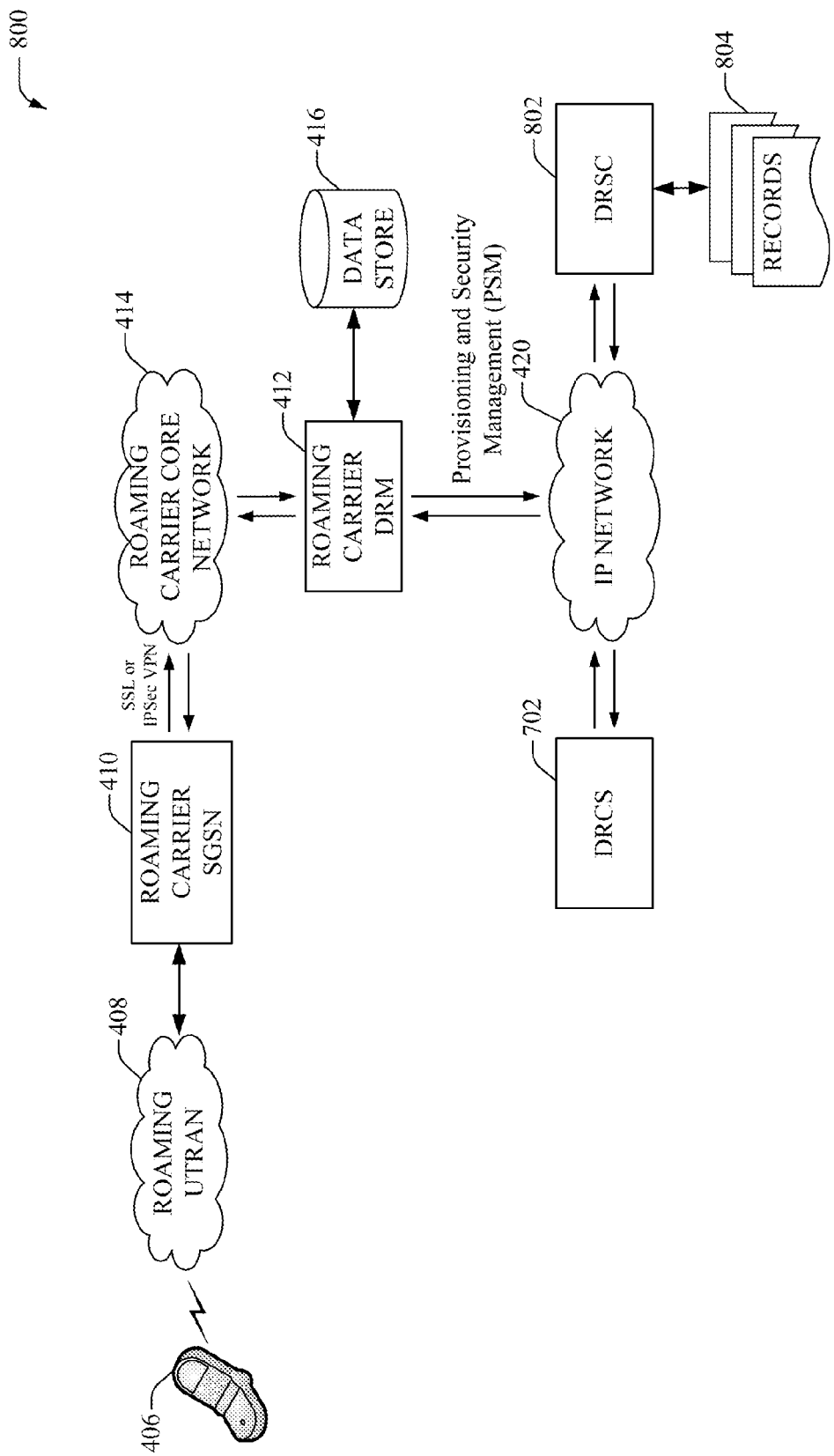
FIG. 8 illustrates an example system that can facilitate storage of security profiles and configuration parameters in a distributed roaming technology architecture in accordance with an aspect.

Referring to FIG. 8, there illustrated is an example system 800 that can facilitate storage of security profiles and configuration parameters in a distributed roaming technology architecture in accordance with an aspect of the subject innovation. A Distributed Roaming Security Catalog (DRSC) 802 is included in system 800 that can interface with an IP network 420. It can be appreciated that UE 406, roaming UTRAN 408, roaming carrier SGSN 410, roaming carrier core network 414, roaming carrier DRM 412, data store 416, and DRCS 702 can each include their respective functionality, as more fully described herein, for example, with regard to systems 400, 500, 600 and 700.

Typically, the DRSC 802 can be a database, which contains provisioning records 804 associated with roaming subscribers received from their respective home carrier networks. Moreover, the DRSC 802 can include a subset of HLR records that are stored in the home carrier network's HLR database. According to an aspect, essential information associated with a subscriber can be stored in the DRSC 802, such as, but not limited to, authorization and/or authentication information. Further, the records 804 can be updated on a schedule/periodic/priority basis or on-demand as driven by the home carrier network. Furthermore, it can be appreciated that IP-based communications, such as, but not limited to, SSL, IPSec, etc. are employed by the DRSC 802 during communication with the home carrier network (and/roaming carrier network). As an example, the DRSC 802 can use an LDAP (Lightweight Directory Access Protocol)-based database or most any other relational database as the record structure. However, it can be appreciated that most any database can be utilized to store records 804. Further, the records 804 can include security profiles and configuration parameters that can be utilized by the DRCS 702 to facilitate management and/or configuration of the roaming carrier DRM 412 and/or DRSs (not shown).

In one embodiment, the DRSC 802 can be implemented as an integral component of the roaming carrier DRM 412. In another embodiment, the DRSC 802 can be implemented as a separate server in the roaming carrier network. Moreover, when implemented as a separate server, the DRSC 802 can be placed either in the same network segment as the roaming carrier DRM 412 or in another location accessible by the roaming carrier core mobility network 414. The DRSC 802 can include volatile memory and nonvolatile memory. By way of illustration, and not limitation, nonvolatile memory can include ROM, PROM, EPROM, EEPROM, FeRAM, or flash memory, while volatile memory can include RAM, which acts as external cache memory.

Figure 9:
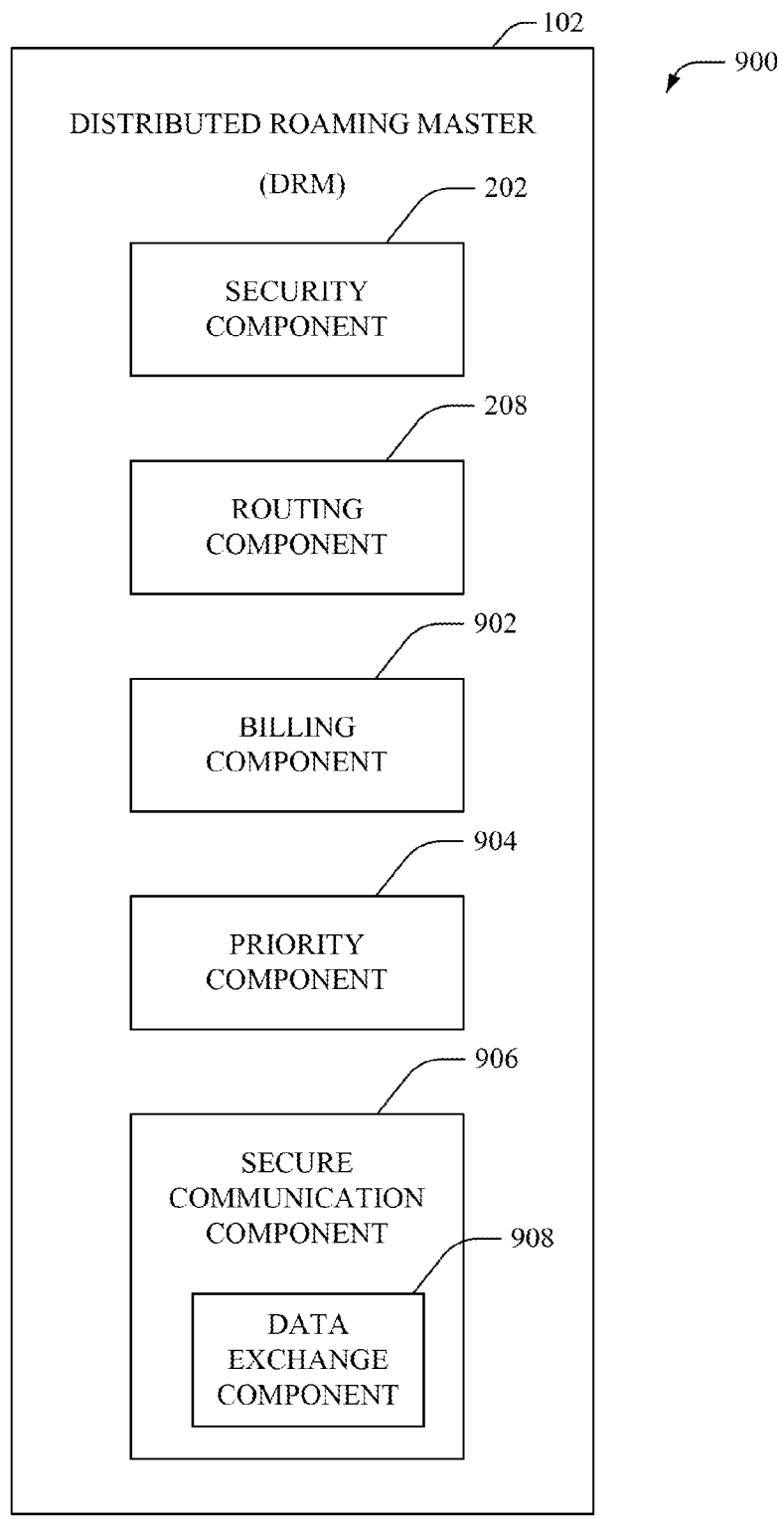
FIG. 9 illustrates an example system that can provide monitoring for billing and/or Quality of Service solutions in accordance with an aspect.

FIG. 9 illustrates an example system 900 that can provide monitoring for billing and/or Quality of Service solutions in accordance with an aspect of the disclosed subject matter. Specifically, system 900 includes a DRM 102 that comprises a security component 202 and a routing component 208, as discussed in detail with respect to FIG. 2. In addition, the DRM 102 can include a billing component 902 that can monitor communications to/from a roaming UE and generate a billing record.

Specifically, the billing component 902 can monitor routing of data packets between the roaming UE and end-destinations via an IP network, e.g., by the routing component 208. Based on the monitoring, the billing component 902 tracks billing records for roaming utilization, e.g., roaming call details for each roaming subscriber. In one aspect, the billing component 902 can store the billing records in a local database (e.g., data store 204 in FIG. 2). According to another aspect, the billing component 902 can transfer the billing records of all subscribers associated with a home network, to a home carrier DRM, via the IP network. Typically, the billing component 902 can periodically update the home carrier DRM, for example, daily, monthly, etc. through IP-based messaging. In one example, a DRCS (702 in FIG. 7) can determine when the billing information can be transferred, based in part on one or more policies. Moreover, the home carrier DRM can facilitate distribution of the received billing records to billing elements in the home carrier network. Additionally, the billing component 902, can receive billing information from disparate carrier DRMs (e.g., over the IP network) for subscribers of the roaming network that are visiting the disparate networks. The billing component 902 can forward the received information to a billing element in the roaming carrier core network.

According to another embodiment, the DRM 102 can include a priority component 904 that can be employed to assign and/or implement QoS priority for a roaming UE. Typically, a network operator can access the priority component 904, locally or remotely, via a user interface to set, modify and/or update QoS priority associated with a UE. Roaming subscribers expect the same range and quality of mobile services as on their home network. Faultless roaming generates extra revenue. Thus, both the roaming carrier network operator and the home carrier network operator can assign QoS priorities for UEs by employing the priority component 904. In one aspect, the priority component 904 can query and/or receive an update from a DRCS, which stores QoS information provided by home carrier network operators. Typically, a home carrier network operator can assign QoS priority in the DRCS, which can then propagate the priority information to DRMs worldwide. In another aspect, a roaming carrier network operator can directly access the priority component 904 and assign QoS priority for specific connections.

Additionally or alternately, the DRM 102 can further include a secure communication component 906 that can facilitate secured communication to/from the DRM over the IP network. As an example, the secure communication component 906 can utilize security attributes associated with a roaming UE to establish a network-to-network virtual private network (NTN-VPN) via the IP network. Typically, the security attributes can be received from a local database (e.g., data store 204) or by querying a home carrier DRM (e.g., by the DRM102). In one embodiment, the local database can be updated with security attributes periodically, on demand, based on a schedule, or at a time when network traffic is low. Further, a data exchange component 908, which can be included within the secure communication component 906, can utilize the established NTN-VPN to deliver data packets to the end-destination securely. As an example, the data exchange component 908 can exchange data packets between a roaming subscriber UE and an end-user enterprise server via the NTN-VPN. Accordingly, the communication can enable a roaming UE to securely access most any data and/or service on a disparate carrier network.

It can be appreciated that although the billing component 902 and/or the priority component 904 are illustrated as part of the DRM 102, in one aspect, the billing component 902 and/or the priority component 904 can be operatively connected to the DRM 102 over a local and/or remote network. Further, it can be appreciated that each DRS (not shown) can also include a billing component and/or priority component that can be substantially similar to the billing component 902 and/or the priority component 904. In one example, the billing components and/or priority components in the DRM 102 and the DRSs can be connected in a hierarchical manner.

Figure 10:
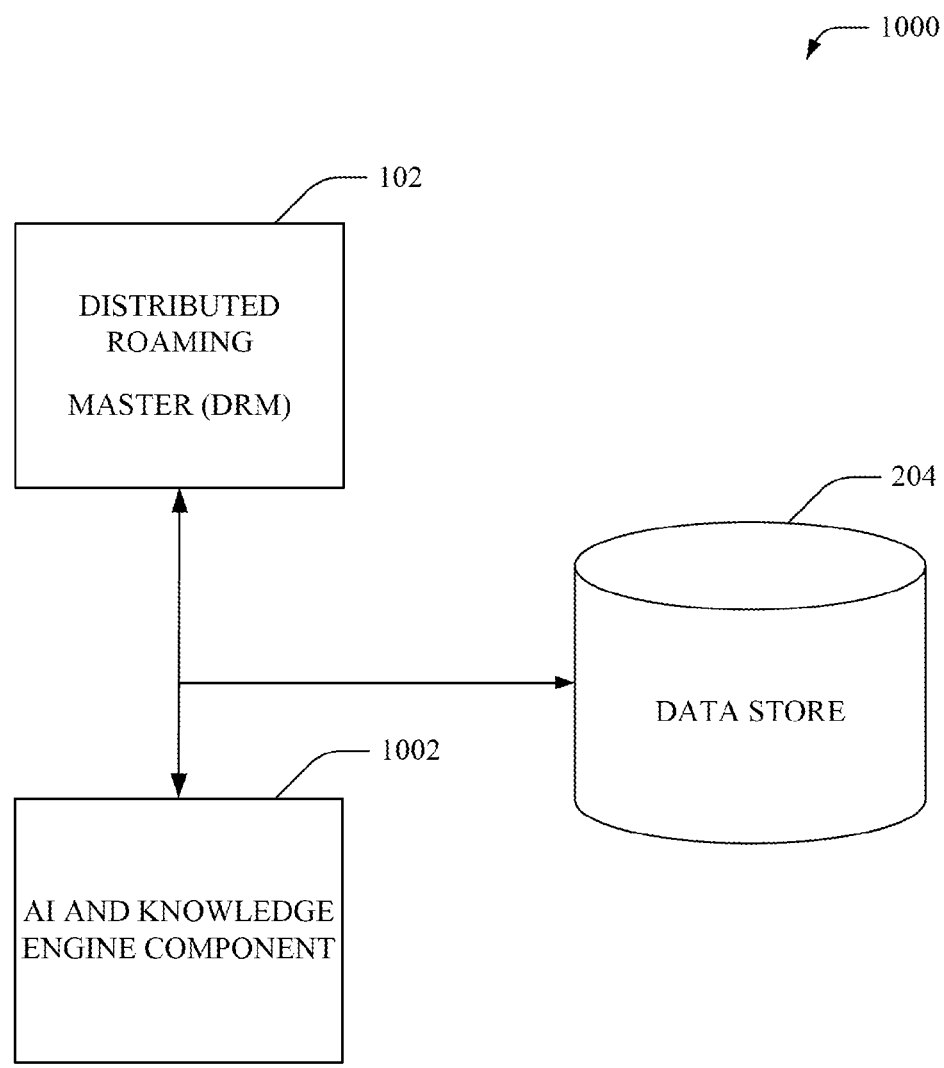
FIG. 10 illustrates an example system that employs an artificial intelligence (AI) component, which facilitates automating one or more features in an embodiment.

FIG. 10 illustrates an example system 1000 that employs an artificial intelligence (AI) and knowledge engine component 1002, which facilitates automating one or more features in accordance with the subject innovation. It can be appreciated that the DRM 102 and data store 204 can each include their respective functionality, as more fully described herein, for example, with regard to systems 100 and 200.

The subject innovation (e.g., in connection with authentication, authorization, routing, updating, etc.) can employ various AI-based schemes for carrying out various aspects thereof. For example, a process for determining authorization of a roaming UE, a process for determining when to update the data store 204, a process for determining how long to store specific information (e.g., roaming profiles) in the data store 204, a process for determining when to transfer information (update) a home carrier DRM, etc., can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria authorization/authentication of a roaming UE, when to update the data store 204 and/or a home carrier DRM. The criteria can include, but is not limited to, the type of device employed by the subscriber, the amount of data to be updated, user preferences, the time of update, the type of data, the importance of the data, etc.

FIGS. 11-14 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 11:
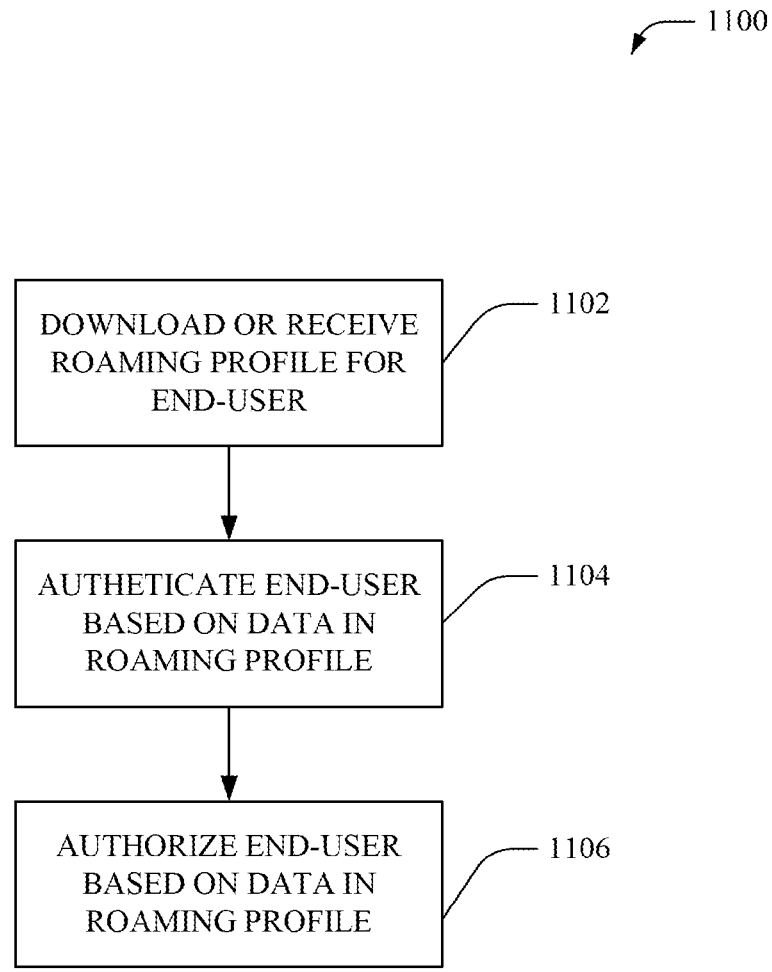
FIG. 11 illustrates an example methodology that facilitates authentication and/or authorization of end-users when the end user is visiting a roaming network, according to an aspect.

Referring now to FIG. 11, illustrated is an example methodology 1100 that facilitates authentication and/or authorization of end-users when the end user is visiting a roaming network, according to an aspect of the disclosed subject innovation. In one embodiment, methodology 1100 can be implemented by an element of the roaming carrier network (e.g., DRM). Specifically, the methodology 1100 can be employed to authenticate and/or authorize an end-user by utilizing IP-based messaging. Accordingly, the methodology 1100 does not to rely on utilization of global roaming exchange (GRX) links for communication and instead communication is via most any secure protocol, (e.g., IPSec, SSL, etc.).

As an example, when the end-user connects to the roaming network, a message can be received over the roaming carrier core network by employing standard IP-based messages, such as but not limited to Secure Sockets Layer (SSL), secure-HTTP (s-http), HTTP-secure (https), etc. According to one embodiment, at 1102, a roaming profile associated with the end-user can be downloaded (e.g., from a local database) or received (e.g., from a home carrier DRM via an IP network). At 1104, the end-user can be authenticated based on the data in the roaming profile. Further, at 1106, the end-user can be authorized, for example to access and utilize the roaming carrier network, based on analyzing the data in the roaming profile.

Figure 12:
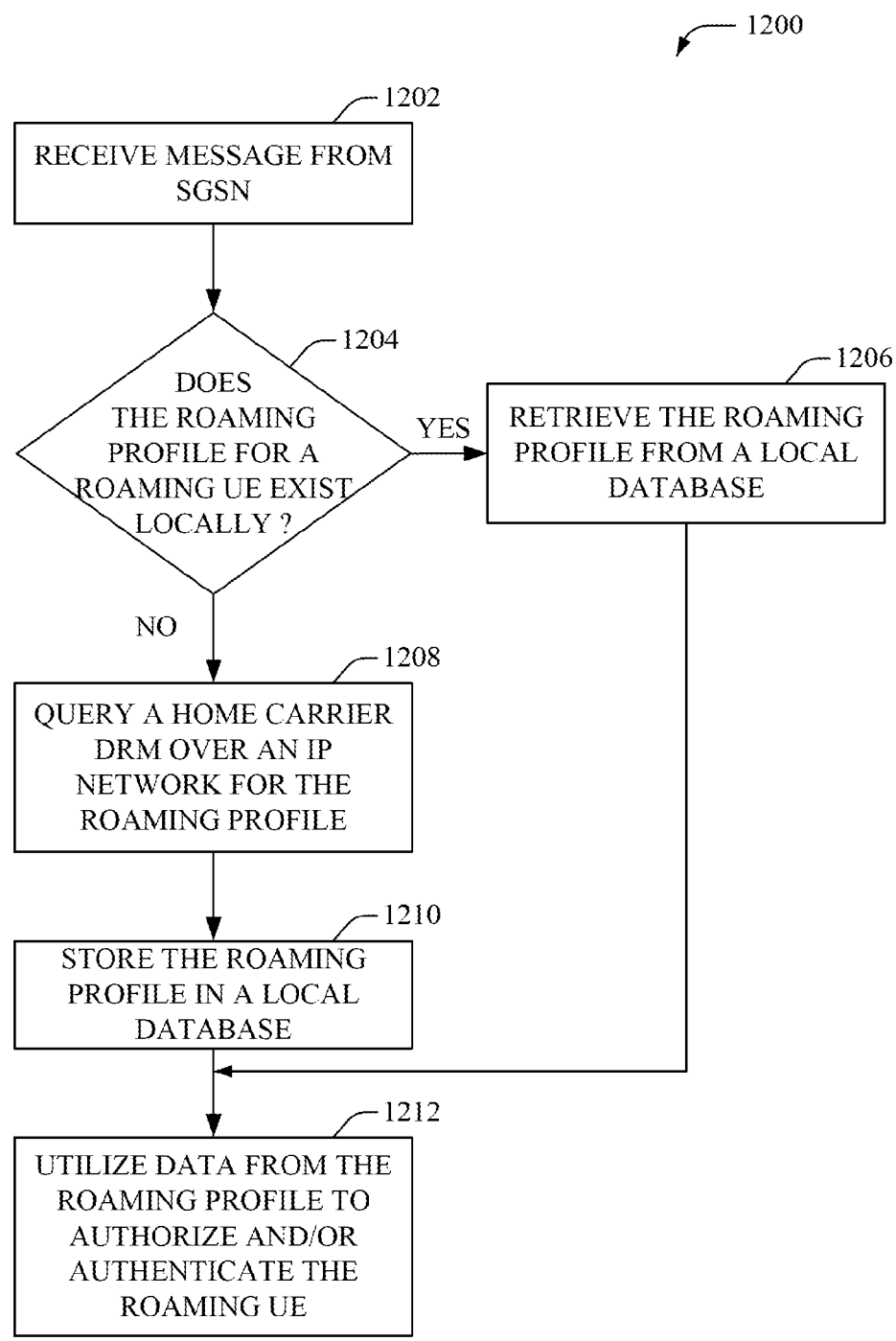
FIG. 12 illustrates an example methodology that can be employed to utilize a roaming profile to authorize and/or authenticate a roaming UE, according to an aspect.

FIG. 12 illustrates an example methodology 1200 that can be employed to utilize a roaming profile to authorize and/or authenticate a roaming UE, according to an aspect of the subject innovation. Typically, when the roaming UE is visiting the roaming carrier network, at 1202, a message can be received from a router element, such as but not limited to, an SGSN in the roaming carrier network. As one example, the message can utilize standard IP-based messages, such as but not limited to Secure Sockets Layer (SSL), secure-HTTP, (s-http), HTTP-secure (https), etc. At 1204, it can be determined whether a roaming profile for the roaming UE exists locally. For example, a lookup operation can be performed on a local (and/or internal) database to search for the roaming profile for the UE.

At 1206, if the roaming profile exists locally, for example, on a local (and/or internal) database, the roaming profile can be retrieved. Else, at 1208, a home carrier DRM can be queried over an IP network for the roaming profile. Typically, end-user roaming profiles can be stored at the home carrier DRM and can include a subset of information associated with the end-user (e.g., subset of information stored in an HLR). The roaming profile can be received over the IP network by employing secure IP-based messages, for example, SSL, https, s-http, etc. At 1210, the retrieved roaming profile can be stored in the local (and/or internal) database. By storing the roaming profile locally, the UE authentication and/or authorization information can be quickly accessed each time the UE attaches to the roaming carrier network. Additionally, the roaming carrier network can continue operations even in the event of a loss of connectivity to a home carrier, since the required information can be locally stored. Further, at 1212, data from the roaming profile (retrieved from the local database or home carrier DRM) can be utilized to authorize and/or authenticate the roaming UE. Once authorized, the roaming UE can access and employ roaming network resources.

Figure 13:
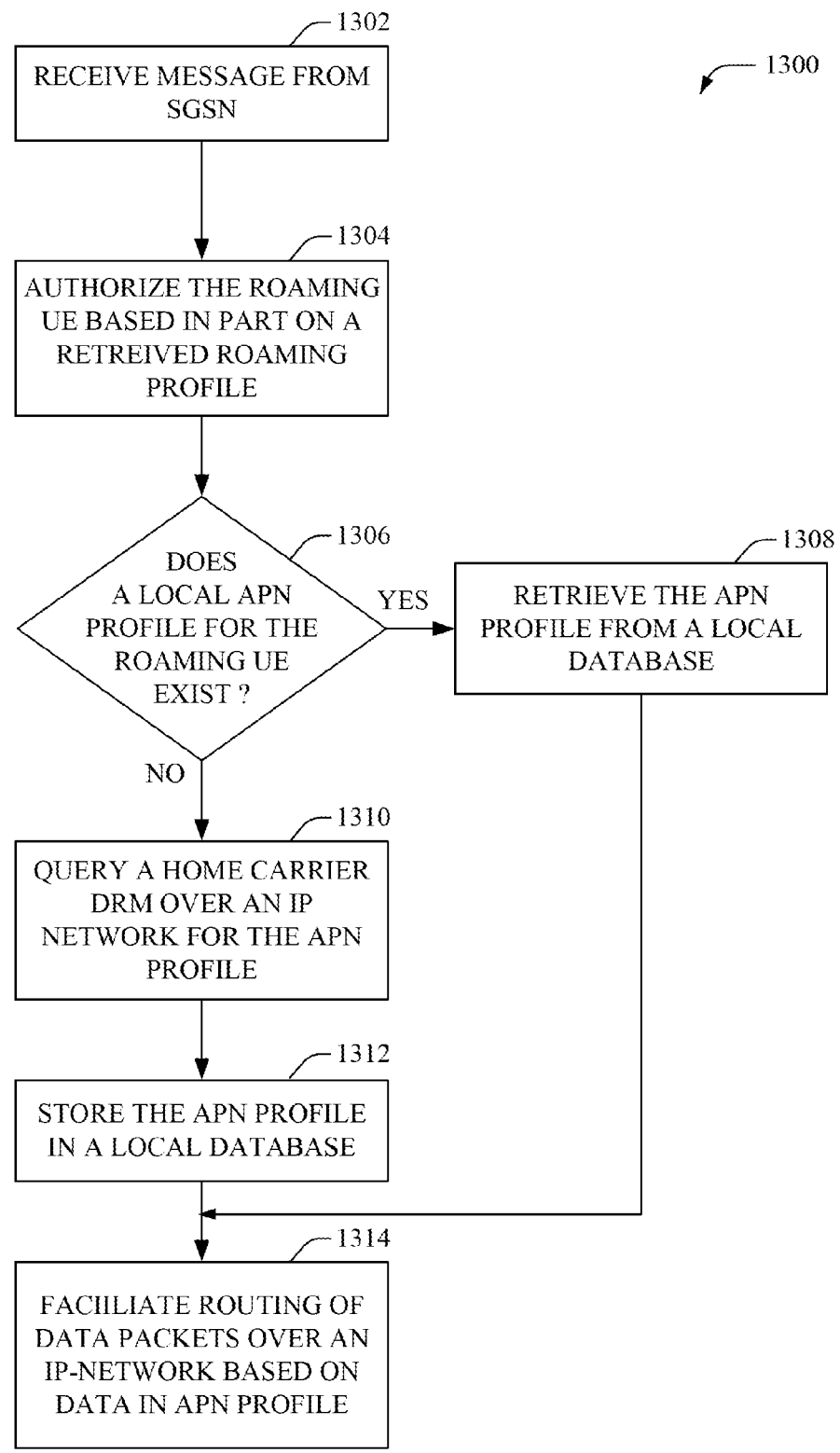
FIG. 13 illustrates an example methodology that facilitates communication between a home and roaming carrier network by employing IP-based messaging in accordance with an aspect.

Now turning to FIG. 13, there illustrated is an example methodology 1300 that facilitates communication between a home and roaming carrier network by employing IP-based messaging in accordance with an aspect of the subject innovation. As an example, methodology 1300 enables roaming carrier networks to route data packets from an authorized roaming UE directly to end-user destinations (e.g., enterprise servers) via an IP network (e.g., Internet) and Network VPNs without having to route packets to a home carrier network GGSN. In one aspect, the methodology 1300 can implement authentication, authorization, and/or routing functions in a distributed manner, which can be tailored to the network architecture of the roaming carrier network.

At 1302, a message can be received from the SGSN, for example, an SSL or IPSec VPN message. As an example, the SGSN can send the message to authenticate and/or determine authorization of a roaming UE that is trying to access the roaming carrier network. At 1304, the roaming UE can be authorized to access the roaming carrier network based in part on a roaming profile of the roaming UE. In one aspect, the roaming profile can be downloaded to a local database in advance, and/or on demand.

At 1306, it can be determined whether a local APN profile for the roaming UE exists. For example, a DRCS can schedule an update for a local database in advance to transfer the APN profile for a roaming UE from a home carrier DRM to the local database, for example, via IP-based messaging. If a local APN profile exists, then at 1308, the APN profile can be retrieved from the local database. Else, at 1310, the home carrier DRM can be queried for the APN profile associated with the roaming UE over an IP network. The APN profile can be received by employing secure IP-based messages, for example, SSL, https, s-http, etc. At 1312, the received APN profile can be stored in the local database for faster access in future. Further, at 1314, routing of data packets for communication with end-user enterprise servers can be facilitated over the IP network based on data from the roaming profile (retrieved from the local database or home carrier DRM). In one example, security attributes can be utilized for establishing via the IP network a NTN-VPN and delivering data packets to the end-destination securely. It can be appreciated that the communication facilitated by the roaming carrier DRM can include, but is not limited to, audio, video, multimedia, real time, and/or streaming content.

Figure 14:
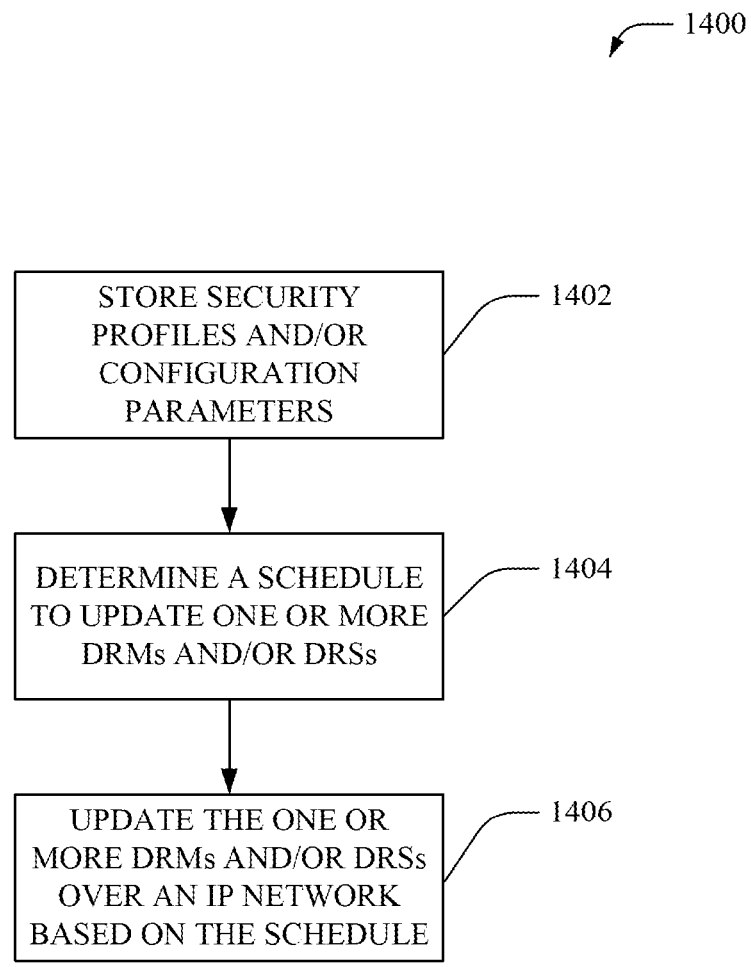
FIG. 14 illustrates an example methodology that facilitates management of a distributed roaming technology architecture.

Referring now to FIG. 14 that illustrates an example methodology 1400, which facilitates management of a distributed roaming technology architecture in accordance with the disclosed subject matter. At 1402, security profiles and/or configuration parameters can be stored, for example in a DRSC. In one example, a home and/or roaming network operator can define the security profiles and/or configuration parameters by employing a user interface. Typically, the security profiles and/or configuration parameters (e.g., IPSec parameters) can be utilized to route data packets between roaming UEs and end-user destinations by bypassing the home carrier GGSNs. As an example, the security profiles ensure exchange data between carrier networks and/or between the DRM and DRS that are authorized to communicate.

At 1404, a schedule can be determined to update and/or synchronize one or more DRMs and/or DRSs. As an example, the DRMs and/or DRSs can be operated within different radio access networks. Moreover, the updates can be periodic, for example, at a specified time, for example, at midnight, once a week, once a month, etc. Additionally or alternately, the updates can be scheduled at a time when network traffic is below a predefined threshold or when the network is idle. At 1406, the one or more DRMs and/or DRSs can be updated by exchanging data over an IP network, based on the schedule. The data exchanged can include, but is not limited to, roaming profiles, APN profiles, security attributes, and/or catalogs.

Figure 15:
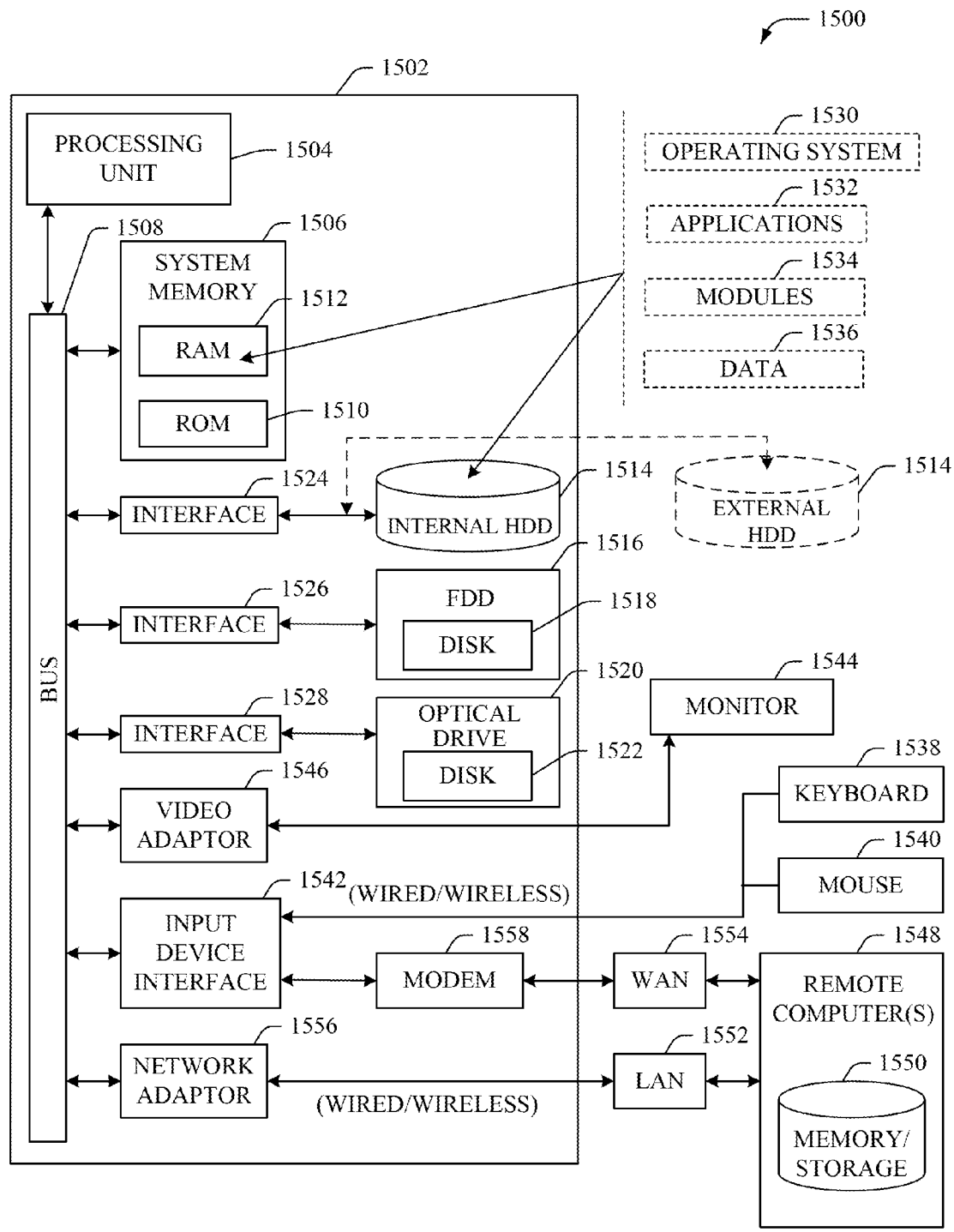
FIG. 15 illustrates a block diagram of a computer operable to execute the disclosed DRTA architecture.

Referring now to FIG. 15, there is illustrated a block diagram of a computer operable to execute the disclosed DRTA architecture. In order to provide additional context for various aspects of the subject specification, FIG. 15 and the following discussion are intended to provide a brief, general description of a suitable computing environment 1500 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, the example environment 1500 for implementing various aspects of the specification includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the specification can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) can include a microphone, an IR remote control, a joystick, a game pad, a stylus pen, touch screen, or the like. These and other input devices are often connected to the processing unit 1504 through an input device interface 1542 that is coupled to the system bus

1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 is connected to the local network 1552 through a wired and/or wireless communication network interface or adapter 1556. The adapter 1556 can facilitate wired or wireless communication to the LAN 1552, which can also include a wireless access point disposed thereon for communicating with the wireless adapter 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are example and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 16:
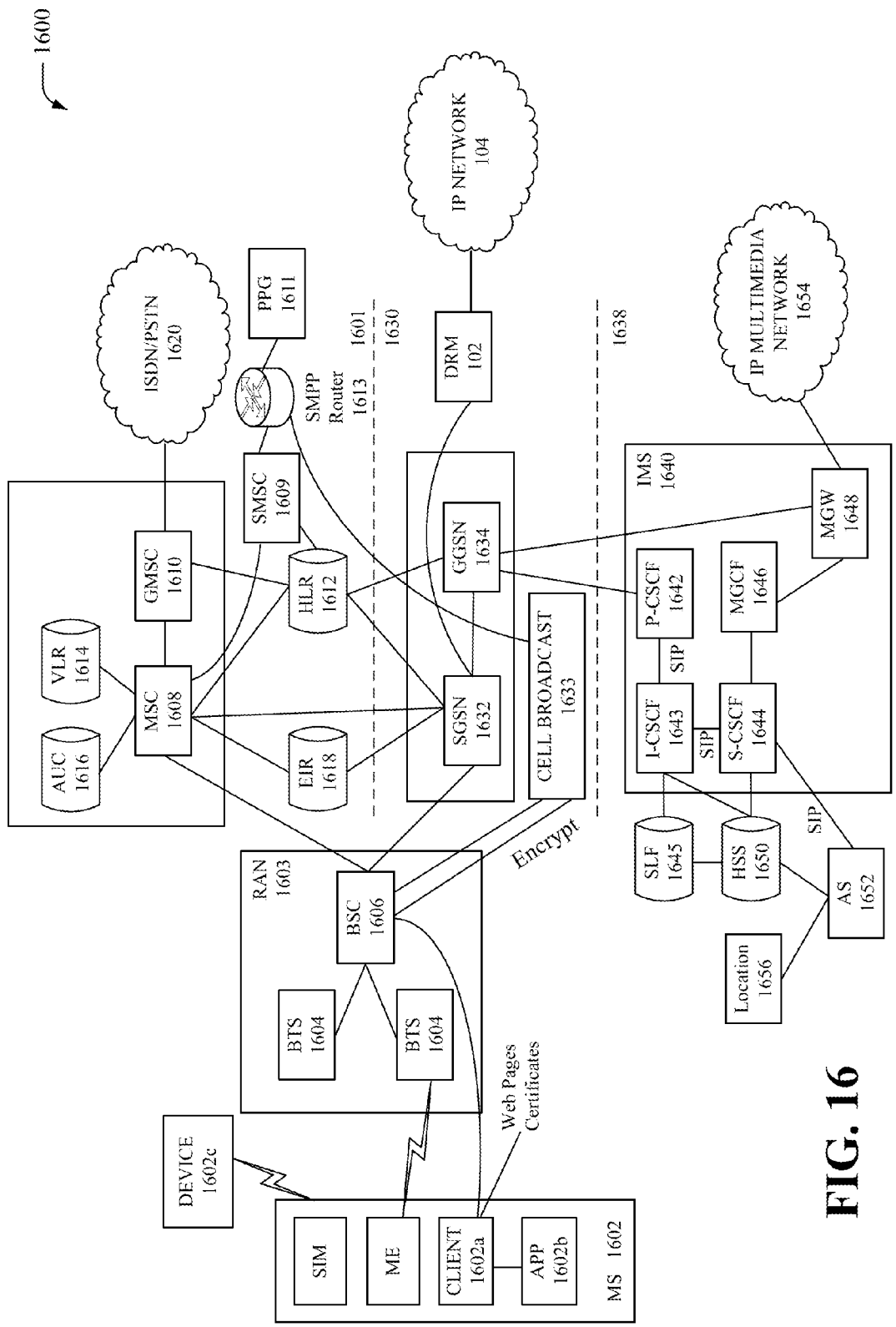
FIG. 16 illustrates a GSM/GPRS/IP multimedia network architecture that can employ the disclosed DRTA architecture.

Now turning to FIG. 16, such figure depicts a GSM/GPRS/IP multimedia network architecture 1600 that can employ the disclosed DRTA architecture. In particular, the GSM/GPRS/IP multimedia network architecture 1600 includes a GSM core network 1601, a GPRS network 1630 and an IP multimedia network 1638. The GSM core network 1601 includes a Mobile Station (MS) 1602, at least one Base Transceiver Station (BTS) 1604 and a Base Station Controller (BSC) 1606. The MS 1602 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1602 includes an embedded client 1602a that receives and processes messages received by the MS 1602. The embedded client 1602a can be implemented in JAVA and is discuss more fully below.

The embedded client 1602a communicates with an application 1602b that provides services and/or information to an end user. One example of the application can be navigation software that provides near real-time traffic information that is received via the embedded client 1602a to the end user. The navigation software can provide road conditions, suggest alternate routes, etc. based on the location of the MS 1602. Those of ordinary skill in the art understand that there are many different methods and systems of locating an MS 1602.

Alternatively, the MS 1602 and a device 1602c can be enabled to communicate via a short-range wireless communication link, such as BLUETOOTH. For example, a BLUETOOTH SIM Access Profile can be provided in an automobile (e.g., device 1602c) that communicates with the SIM in the MS 1602 to enable the automobile's communications system to pull information from the MS 1602. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1602c. There can be an endless number of devices 1602c that use the SIM within the MS 1602 to provide services, information, data, audio, video, etc. to end users.

The BTS 1604 is physical equipment, such as a radio tower, that enables a radio interface to communicate with the MS. Each BTS can serve more than one MS. The BSC 1606 manages radio resources, including the BTS. The BSC can be connected to several BTSs. The BSC and BTS components, in combination, are generally referred to as a base station (BSS) or radio access network (RAN) 1603.

The GSM core network 1601 also includes a Mobile Switching Center (MSC) 1608, a Gateway Mobile Switching Center (GMSC) 1610, a Home Location Register (HLR) 1612, Visitor Location Register (VLR) 1614, an Authentication Center (AuC) 1618, and an Equipment Identity Register (EIR) 1616. The MSC 1608 performs a switching function for the network. The MSC also performs other functions, such as registration, authentication, location updating, handovers, and call routing. The GMSC 1610 provides a gateway between the GSM network and other networks, such as an Integrated Services Digital Network (ISDN) or Public Switched Telephone Networks (PSTNs) 1620. In other words, the GMSC 1610 provides interworking functionality with external networks.

The HLR 1612 is a database or component(s) that comprises administrative information regarding each subscriber registered in a corresponding GSM network. The HLR 1612 also includes the current location of each MS. The VLR 1614 is a database or component(s) that contains selected administrative information from the HLR 1612. The VLR contains information necessary for call control and provision of subscribed services for each MS currently located in a geographical area controlled by the VLR. The HLR 1612 and the VLR 1614, together with the MSC 1608, provide the call routing and roaming capabilities of GSM. The AuC 1616 provides the parameters needed for authentication and encryption functions. Such parameters allow verification of a subscriber's identity. The EIR 1618 stores security-sensitive information about the mobile equipment.

A Short Message Service Center (SMSC) 1609 allows one-to-one Short Message Service (SMS) messages to be sent to/from the MS 1602. A Push Proxy Gateway (PPG) 1611 is used to "push" (e.g., send without a synchronous request) content to the MS 1602. The PPG 1611 acts as a proxy between wired and wireless networks to facilitate pushing of data to the MS 1602. A Short Message Peer to Peer (SMPP) protocol router 1613 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1602 sends a location update including its current location information to the MSC/VLR, via the BTS 1604 and the BSC 1606. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1630 is logically implemented on the GSM core network architecture by introducing two packet-switching network nodes, a serving GPRS support node (SGSN) 1632, a cell broadcast and a Gateway GPRS support node (GGSN) 1634. The SGSN 1632 is at the same hierarchical level as the MSC 1608 in the GSM network. The SGSN controls the connection between the GPRS network and the MS 1602. The SGSN also keeps track of individual MS's locations, security functions, and access controls. As described supra, SGSN 1632 can communicate with a DRM 102 that provides an IP interface to connect to disparate radio access networks via IP network 104.

A Cell Broadcast Center (CBC) 1633 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vise versa.

The IP multimedia network 1638 was introduced with 3GPP Release 5, and includes an IP multimedia subsystem (IMS) 1640 to provide rich multimedia services to end users. A representative set of the network entities within the IMS 1640 are a call/session control function (CSCF), a media gateway control function (MGCF) 1646, a media gateway (MGW) 1648, and a master subscriber database, called a home subscriber server (HSS) 1650. The HSS 1650 can be common to the GSM network 1601, the GPRS network 1630 as well as the IP multimedia network 1638.

The IP multimedia system 1640 is built around the call/session control function, of which there are three types: an interrogating CSCF (I-CSCF) 1643, a proxy CSCF (P-CSCF) 1642, and a serving CSCF (S-CSCF) 1644. The P-CSCF 1642 is the MS's first point of contact with the IMS 1640. The P-CSCF 1642 forwards session initiation protocol (SIP) messages received from the MS to an SIP server in a home network (and vice versa) of the MS. The P-CSCF 1642 can also modify an outgoing request according to a set of rules defined by the network operator (for example, address analysis and potential modification).

The I-CSCF 1643 forms an entrance to a home network and hides the inner topology of the home network from other networks and provides flexibility for selecting an S-CSCF. The I-CSCF 1643 can contact a subscriber location function (SLF) 1645 to determine which HSS 1650 to use for the particular subscriber, if multiple HSS's 1650 are present. The S-CSCF 1644 performs the session control services for the MS 1602. This includes routing originating sessions to external networks and routing terminating sessions to visited networks. The S-CSCF 1644 also decides whether an application server (AS) 1652 is required to receive information on an incoming SIP session request to ensure appropriate service handling. This decision is based on information received from the HSS 1650 (or other sources, such as an application server 1652). The AS 1652 also communicates to a location server 1656 (e.g., a Gateway Mobile Location Center (GMLC)) that provides a position (e.g., latitude/longitude coordinates) of the MS 1602.

The HSS 1650 contains a subscriber profile and keeps track of which core network node is currently handling the subscriber. It also supports subscriber authentication and authorization functions (AAA). In networks with more than one HSS 1650, a subscriber location function provides information on the HSS 1650 that contains the profile of a given subscriber.

The MGCF 1646 provides interworking functionality between SIP session control signaling from the IMS 1640 and ISUP/BICC call control signaling from the external GSTN networks (not shown). It also controls the media gateway (MGW) 1648 that provides user-plane interworking functionality (e.g., converting between AMR- and PCM-coded voice). The MGW 1648 also communicates with other IP multimedia networks 1654.

What has been described above includes examples of the present specification. It is, of course, not possible to describe every conceivable combination of components or methodologies for purposes of describing the present specification, but one of ordinary skill in the art can recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a non-transitory memory to store instructions; and
   a processor, coupled to the non-transitory memory, that facilitates execution of the instructions to perform operations, comprising:
   receiving, via an authorized device, configuration data associated with a first distributed roaming master device within a first radio access carrier network and a second distributed roaming master device within a second radio access carrier network, wherein the configuration data comprises parameter data indicative of an internet protocol security parameter, and wherein the first distributed roaming master device authenticates a roaming user equipment that is subscribed to the second radio access carrier network based on profile data associated with the roaming user equipment that is downloaded from the second distributed roaming master device over an internet protocol network, wherein the configuration data comprises timing data indicative of a time period for synchronization of the first distributed roaming master device with distributed roaming servers that resides within the first radio access carrier network, wherein the distributed roaming servers perform a subset of functions performed by the first distributed roaming master device and provide an internet protocol interface that is utilized for communication with a network device of a third radio access carrier network by utilization of internet protocol-based messaging, and wherein the synchronization is facilitated via a set of extensible markup language strings over secure sockets layer messages, and
   facilitating a transmission of the parameter data to the first distributed roaming master device via a set of secure sockets layer messages, wherein the second radio access carrier network comprises a gateway general packet radio service support node device and the parameter data is employed by the first distributed roaming master device to facilitate routing of a data packet received from the roaming user equipment to a destination device within the second radio access carrier network by bypassing the gateway general packet radio service support node device.

2. The system of claim 1, wherein the profile data comprises information indicative of an access point name profile associated with the roaming user equipment.

3. The system of claim 1, wherein, the transmission is a first transmission and the operations further comprise:
   facilitating a second transmission of the configuration data to the second distributed roaming master device via a set of extensible markup language applications peer-to-peer messages.

4. The system of claim 1, wherein, the operations further comprise:
   instructing the first distributed roaming master device to download the profile data prior to the roaming user equipment being determined to enter a coverage area associated with the first radio access carrier network.

5. The system of claim 1, wherein the operations further comprise:
   tracking a billing record for roaming utilization by the roaming user equipment, comprising monitoring a communication between the roaming user equipment and the destination device; and
   facilitating implementation of a quality of service priority for the roaming user equipment based on the configuration data.

6. The system of claim 5, wherein the first distributed roaming master device establishes, via the internet protocol network, a network-to-network virtual private network based on the profile data to facilitate secure delivery of a data packet between the roaming user equipment and the destination device.

7. A method, comprising:
   receiving, by a system comprising a processor, configuration data associated with a first distributed roaming master device within a first roaming carrier network that authenticates a user equipment in accordance with profile data associated with the user equipment received from a second distributed roaming master device in a home carrier network of the user equipment, wherein the receiving comprises receiving parameter data indicative of an internet protocol security parameter via a secure sockets layer protocol, and wherein the parameter data comprises timing data indicative of a time period for synchronizing the first distributed roaming master device with a set of distributed roaming server devices that perform a subset of functions performed by the first distributed roaming master device;
   based on the timing data, facilitating, by the system, a synchronization of the first distributed roaming master device and the set of distributed roaming server devices via a set of extensible markup language strings over secure sockets layer messages; and
   employing, by the system, the parameter data to facilitate routing of a data packet, received via the user equipment, between the first distributed roaming master device and a destination device within the home carrier network, wherein the home carrier network comprises a gateway general packet radio service support node device and the routing comprises routing of the data packet independent of communication with the gateway general packet radio service support node device.

8. The method of claim 7, further comprising:
   receiving, by the system, the profile data prior to the user equipment entering a coverage area associated with the roaming access carrier network.

9. The method of claim 7, further comprising:
monitoring, by the system, a communication between the user equipment and the destination device; and
based on the monitoring, determining, by the system, a billing record for roaming utilization of the roaming carrier network by the user equipment.

10. The method of claim 7, further comprising:
based on defined security data, restricting, by the system, exchange of specific information between the first distributed roaming master device and the set of distributed roaming server devices during the synchronizing.

11. The method of claim 7, further comprising:
facilitating, by the system, communication between the set of distributed roaming server devices based on priority data.

12. The method of claim 7, further comprising:
facilitating, by the system, communication between the set of distributed roaming server devices based on proximity data.

13. A non-transitory computer-readable storage medium having instructions stored thereon that, in response to execution, cause a system comprising a processor to perform operations, comprising:
receiving, via an authorized device, first timing data associated with a first distributed roaming master device within a first radio access carrier network and a second distributed roaming master device within a second radio access carrier network, wherein the first timing data is indicative of a schedule that specifies when profile data associated with a user equipment is to be downloaded from the second distributed roaming master device to the first distributed roaming master device to facilitate authentication of the user equipment;
receiving, via the authorized device, parameter data indicative of an internet protocol security parameter comprising receiving second timing data indicative of a time period for synchronizing the first distributed roaming master device with a set of distributed roaming server devices that perform a subset of functions performed by the first distributed roaming master device;
based on the second timing data, facilitating a synchronization of the first distributed roaming master device and the set of distributed roaming server devices via a set of extensible markup language strings over a set of secure sockets layer messages; and
facilitating a transmission of the parameter data and the first timing data to the first distributed roaming master device, wherein the second radio access carrier network comprises a gateway general packet radio service support node device and the parameter data is employed by the first distributed roaming master device to facilitate routing of a data packet received from the user equipment to a destination device within the second radio access carrier network by bypassing the gateway general packet radio service support node device.

14. The non-transitory computer-readable storage medium of claim 13, wherein the facilitating comprises facilitating the transmission via a set of extensible markup language applications peer-to-peer messages.

15. The non-transitory computer-readable storage medium of claim 13, wherein the facilitating comprises facilitating the transmission via another set of secure sockets layer messages.

* * * * *